United States Patent
Smith et al.

(10) Patent No.: US 6,935,829 B2
(45) Date of Patent: Aug. 30, 2005

(54) TRUCK OPERATED TRANSFER SYSTEM APPARATUS AND METHOD

(75) Inventors: Fred P. Smith, Alpine, UT (US); Todd Mendenhall, Riverton, UT (US); Curtis B. Workman, Prineville, OR (US)

(73) Assignee: Smith Patents, L.L.C., Alpine, UT (US)

( * ) Notice: Subject to any disclaimer, the term of this patent is extended or adjusted under 35 U.S.C. 154(b) by 148 days.

(21) Appl. No.: 10/188,435

(22) Filed: Jul. 2, 2002

(65) Prior Publication Data

US 2003/0077157 A1 Apr. 24, 2003

Related U.S. Application Data

(60) Provisional application No. 60/302,630, filed on Jul. 2, 2001.

(51) Int. Cl.[7] .................................................. B60P 1/64
(52) U.S. Cl. ........................ 414/499; 414/477; 414/498
(58) Field of Search ................................ 414/499, 477, 414/478, 491, 494, 498, 500

(56) References Cited

U.S. PATENT DOCUMENTS

| | | | | |
|---|---|---|---|---|
| 1,910,398 A | * | 5/1933 | Ludington | .................. 414/470 |
| 2,588,001 A | * | 3/1952 | Holland | ....................... 414/477 |
| 2,849,129 A | | 8/1958 | Likens | .......................... 214/38 |
| 3,540,607 A | * | 11/1970 | Mandel | ....................... 414/537 |
| 4,058,231 A | * | 11/1977 | Visa et al. | .................. 414/494 |
| 4,737,063 A | | 4/1988 | van den Pol et al. | ....... 414/346 |
| 5,143,496 A | | 9/1992 | Smith et al. | .................. 410/68 |
| 5,219,260 A | | 6/1993 | Smith et al. | ................ 414/345 |

* cited by examiner

Primary Examiner—Thomas J. Brahan
(74) Attorney, Agent, or Firm—Pate Pierce & Baird

(57) ABSTRACT

A transfer system for transferring a transfer body onto a truck. The impetus to move the transfer body is provided by a driver mounted to the truck. The driver may engage a track extending along the transfer body in order to move the transfer body onto the truck. The track may be mounted to a pull bar pivotably secured near one end to the transfer body. The truck may have a dump-truck body with a continuous floor. The pull bar may be pulled underneath the floor as the transfer body is transferred onto the truck whereas the transfer body is pulled onto the floor. A latching system for a transfer module is actuated by a mechanism mounted on the truck and maintains the tailgate of the transfer body closed when remote from a truck. The mechanism may also operate a latching system latching and unlatching a tailgate secured to the body of the truck.

17 Claims, 32 Drawing Sheets

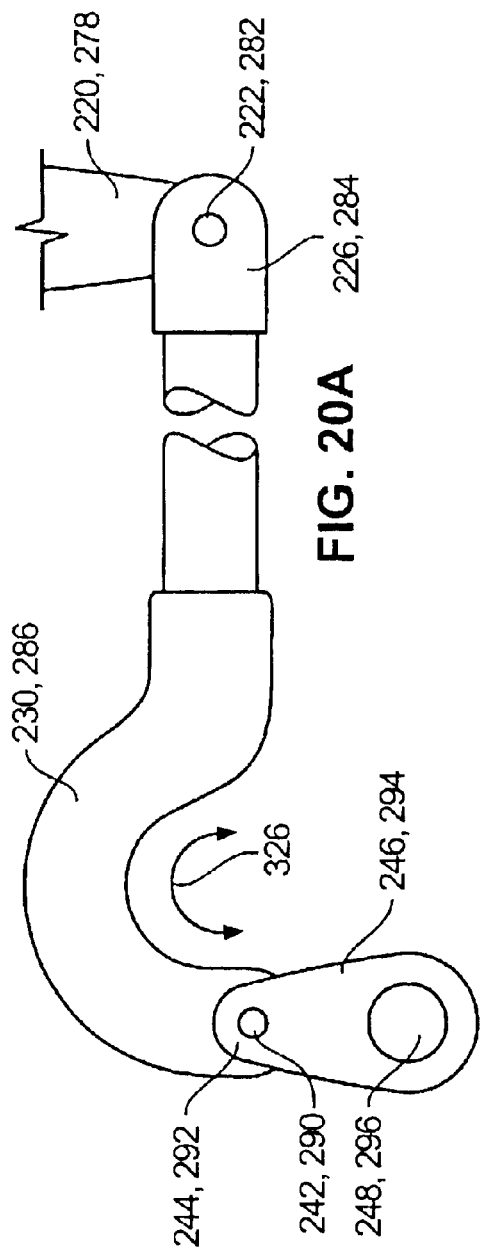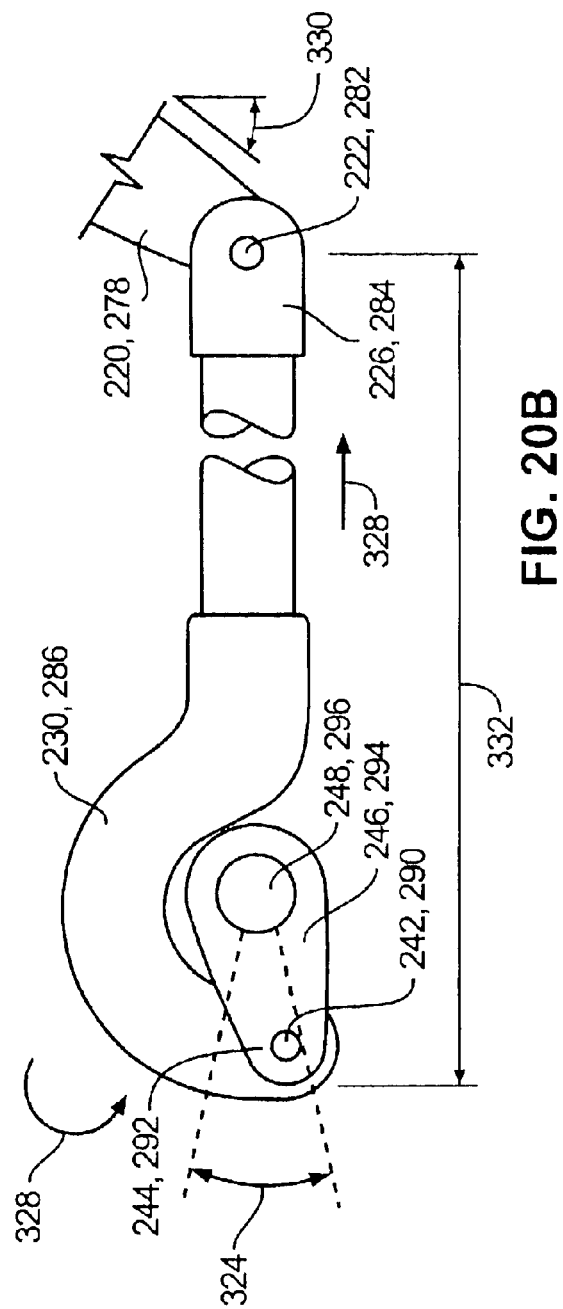

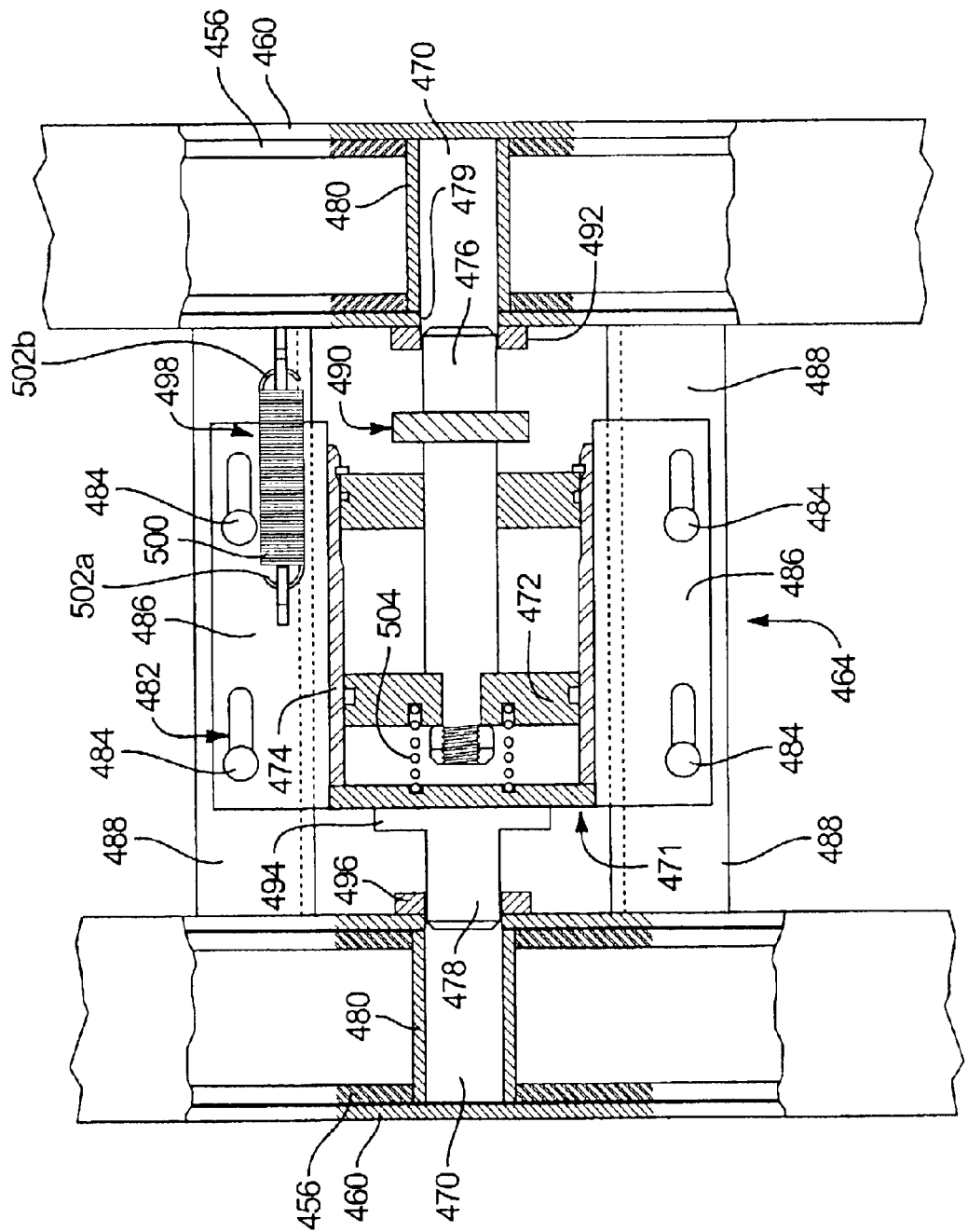
FIG. 25A  SECTION A-A

SECTION A-A

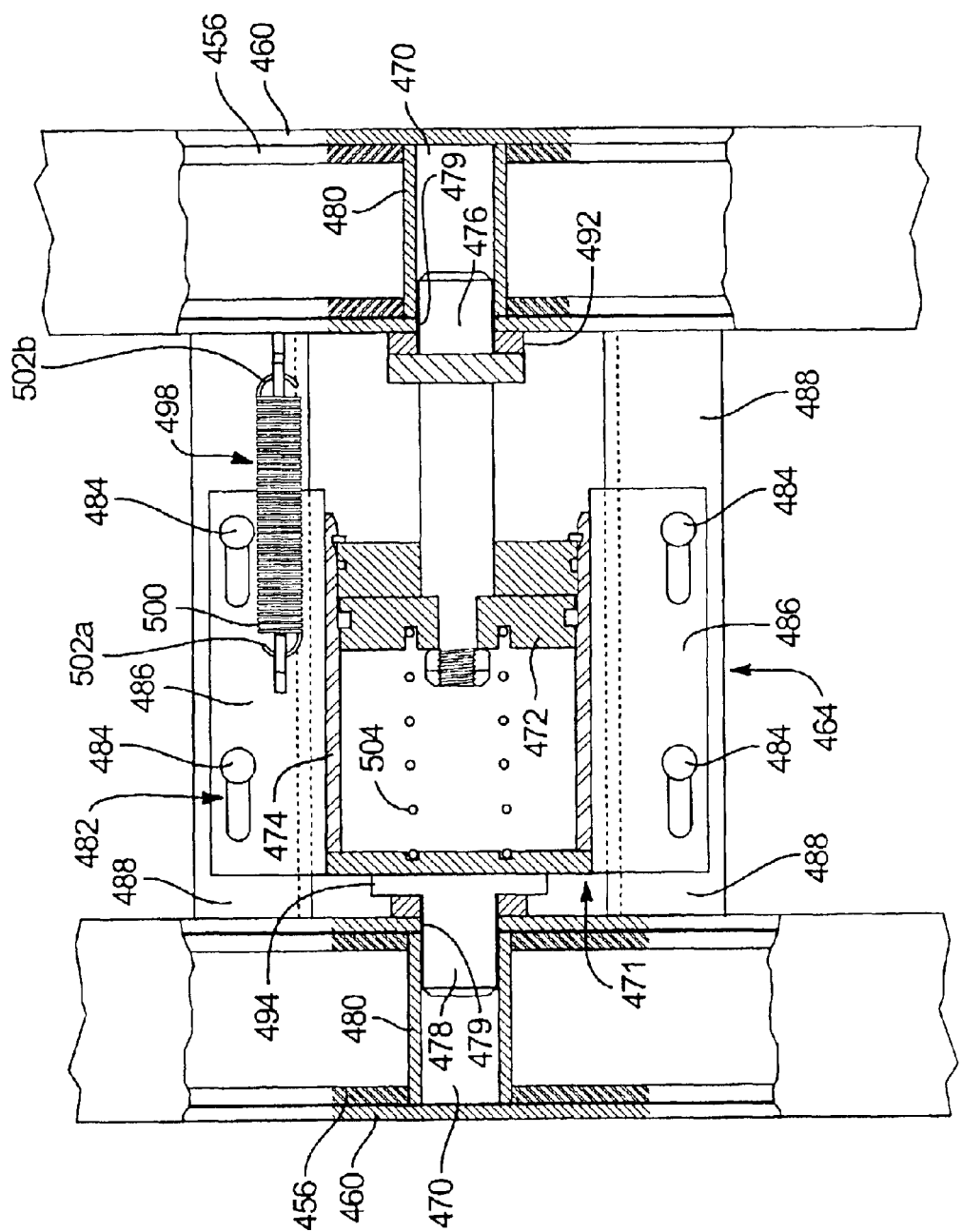
FIG. 25C   SECTION A-A

TRUCK OPERATED TRANSFER SYSTEM APPARATUS AND METHOD

RELATED APPLICATIONS

This patent application claims the benefit of U.S. Provisional Patent Application Ser. No. 60/302,630 filed Jul. 2, 2001 and entitled Truck Operated Transfer System.

BACKGROUND

1. The Field of the Invention

This invention relates generally to the field of transfer equipment. More particularly this invention relates to an apparatus to move a body from a supporting structure onto a truck. This invention also relates to mechanisms for coupling trailers to vehicles. More particularly, the invention relates to draw bars for securing trailers to trucks.

2. The Background Art

In many instances cargo or equipment needs to be loaded onto trucks. These loads are generally very large and may require specialized equipment to aid in loading and unloading. Loads maybe containers, dump-truck bodies, mechanical equipment such as cranes or spreaders, or the like. A special problem exists where the transfer of a load onto a truck needs to take place away from industrial equipment such as cranes, fork-lifts, or other supporting equipment. In such cases the capability to transfer the load must be relocatable to the location of the vehicle.

In some situations an operator of a truck may maximize the amount of cargo hauled during a trip by carrying a load mounted on the truck as well as drawing a trailer carrying additional cargo. For example, a dump truck may tow a trailer having an additional dump truck body mounted thereto. In this manner the truck may carry more cargo to or from a work site in a single trip. In some locations local laws may limit the weight of the load a truck is allowed to carry, based on the number of axles and the spacing between axles. Thus a trailer allows a truck to carry more load than the law would normally permit the truck to carry directly.

Dump trucks have long made use of such functionality by towing "pup trailers" having their own dumping body. In some cases a pup trailer may have its own hydraulics to effect dumping of a load. A dump truck may also tow a transfer trailer that does not have dumping hydraulics. The body of the transfer trailer must therefore be transferred into the dumping body on the truck in order for the load to be dumped. An advantage of a transfer trailer is that a truck can transport a large load because of the extended wheel base of the truck and transfer trailer, and yet can still have good maneuverability at the dump-site because of the short wheelbase of the dump truck. In addition the transfer trailer is made inexpensive through the elimination of hydraulic dumping hardware or other complex systems.

Some transfer trailers have small roller wheels that are powered along a track by an air or even electrical motor mounted to a transfer body resting on the transfer trailer. In typical operation an operator will position the back of the truck adjacent the front of the transfer trailer. The operator then exit the truck and goes to a switch at the back of the transfer trailer. The operator will then activate a switch that powers the wheels to propel the transfer body into the truck body. In some cases the roller wheels may roll along rails on the transfer trailer. In some systems, the operator must continually apply force to the switch as the transfer body moves from the trailer frame into the truck body in order to load the transfer body. Accordingly, the operator is obliged to walk along with the transfer body as it is loaded into the truck.

Such a manner of operation has many inconveniences and disadvantages. First of all, the operator must exit the safety and controlling environment of the truck in order to effect the loading of the transfer trailer body. The unprotected operator is very close to a moving object weighing many tons during the process. In addition, the amount of force that can be transferred between the transfer body roller wheels and the transfer trailer is limited by the frictional forces that the roller wheel can exert on the rails.

The amount of energy available to effect the transfer is also limited by the amount of energy that can be stored on the transfer body as pressurized gas, a battery, or the like. Thus, the wheels may not be able to overcome the weight of the transfer body if the transfer trailer is inclined. Thus, it would be an advancement in the art to provide a transfer system powered by the truck, in order to provide more power and energy to effect transfer of the transfer body. It would be a further advancement in the art to provide a transfer system that could be operated from within the cab of a truck.

Once the transfer body is loaded onto the truck the operator is then required to again exit the truck and unlatch the tailgate of the transfer body so the load can be dumped. The operator then must enter the cab of the truck to operate the controls for the hydraulics to dump the contents of the transfer body. Disadvantages to this manner of operation include the fact that the driver must exit the truck to unlatch the tailgate. It may also pose a safety risk, inasmuch as the load maybe exerting a force on the tailgate such that when the latch is released the load may spill out creating potential for potential harm of the operator.

In some applications it maybe advantageous for the truck to be in motion when the latch is released, such as when the truck is being used to spread material. Thus, a further disadvantage of such a conventional system is that the transfer body cannot be used to spread material, since the tailgate cannot be unlatched while the truck is in motion. Thus it would be an advancement in the art to provide a transfer body having a tailgate latch operable from within the cab of a truck.

A transfer trailer may be secured to a truck by a draw bar. The draw bar typically has a fixed length such that the truck must be positioned at a precise distance from the trailer in order for the draw bar to connect to a hitch on the truck. To accomplish this an operator will typically turn off the engine and leave the truck with the brake disengaged, the transmission in reverse gear, and the clutch engaged. The operator will then walk to the back of the truck and push a button activating the starter motor of the truck, thereby causing the truck to move toward the drawbar. The operator is thereby enabled to position the truck with sufficient precision to connect the draw bar to the truck.

This manner of operation has the principle disadvantage that an operator must stand behind a truck weighing many tons and set it in motion without access to a brake. A further disadvantage is that it is not conveniently performed with trucks having automatic transmissions. Thus it would be an advancement in the art to provide a drawbar that is extensible, enabling an operator to position the truck with less precision relative to the trailer. The operator would then be able to safely engage the brake of the truck before walking behind the truck to connect the draw bar to the truck. The draw bar could then be extended to reach the hitch on the truck, compensating for imprecision in the position of the truck relative to the transfer trailer. Such an extensible draw bar would have applications for a variety of trailers, besides transfer trailers, that makes use of draw bars in order to connect to a towing vehicle.

BRIEF SUMMARY OF THE INVENTION

An invention is disclosed in sufficient detail to enable one of ordinary skill in the art to make and use the invention. In some embodiments a transfer module may rest on a support. In some embodiments a driver mounted to a truck may engage a track secured to the transfer module. The driver may engage the track in order to draw the transfer module onto the truck. In some embodiments the truck may have a dumping body having a substantially continuous floor. The track may be mounted to a pull bar secured at the rearward end of the transfer module. The pull bar may be pivotably secured to the rearward end of the transfer module. The transfer module may be pulled inside the dumping body whereas the pull bar may be located underneath the dumping body when the transfer module is loaded onto the truck.

The track maybe a chain extending along the pull bar and the driver may have a sprocket configured to engage the chain. Registration members such as horns secured to the forward end of the support may serve to align the transfer module and truck. The horns may insert into tubes or cavities formed in the truck.

In some embodiments the transfer module may be embodied as a transfer dumping body having a tailgate. A latching system may enable an operator to latch and unlatch the tailgate of the transfer dumping body. In some embodiments an actuator may drive the movement of the latching system. In some embodiments the actuator may serve to both latch and unlatch the tailgate of the transfer dumping body as well as the tailgate of the dumping body mounted on the truck. In certain embodiments a locking systems may maintain the tailgates of the transfer dumping body and truck-mounted dumping body latched. In certain embodiments the locking systems may maintain themselves locked without the continuous application of force. In certain embodiments a locking system may be embodied as an over-center lock taking advantage of the toggle position of a linkage forming part of the locking system.

A trailer may have a draw bar secured thereto. A truck hitch may secure near a free end of the draw bar. In certain embodiments an extension may be adjustable with respect to the remaining portion of the draw bar. In certain embodiments a lock may be activated to fix the position of the extension relative to the remainder of the draw bar. In certain embodiments the lock maybe embodied as pins or posts secured to a pneumatic piston. The pneumatic piston may fix the position of the extension relative to the remaining portion by forcing a pin, post, or the like, into an aperture formed in the free end. In certain embodiments an extender may provide the force to drive the extension outwardly from the remaining portion in order to extend the length of the draw bar. In certain embodiments the extender may be a pneumatic piston acting on the extension.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIGS. 20A and 20B are side elevation views of an over-center lock in accordance with the invention;

FIG. 25A–C are cross sectional views illustrating the manner of operation of a lock suitable for use with an extensible draw bar in accordance with the invention;

DETAILED DESCRIPTION OF THE PREFERRED EMBODIMENTS

It will be readily understood that the components of the present invention, as generally described and illustrated in the Figures herein, may be arranged and designed in a wide variety of different configurations. Thus, the following more detailed description of the embodiments of the system and method of the present invention, as represented in FIGS. 1 through 28C, is not intended to limit the scope of the invention. The scope of the invention is as broad as claimed herein. The illustrations are merely representative of certain, presently preferred embodiments of the invention. Those presently preferred embodiments of the invention will be best understood by reference to the drawings, wherein like parts are designated by like numerals throughout.

Those of ordinary skill in the art will, of course, appreciate that various modifications to the details of the Figures may easily be made without departing from the essential characteristics of the invention. Thus, the following description of the Figures is intended only by way of example, and simply illustrates certain presently preferred embodiments consistent with the invention as claimed.

Figure 1:
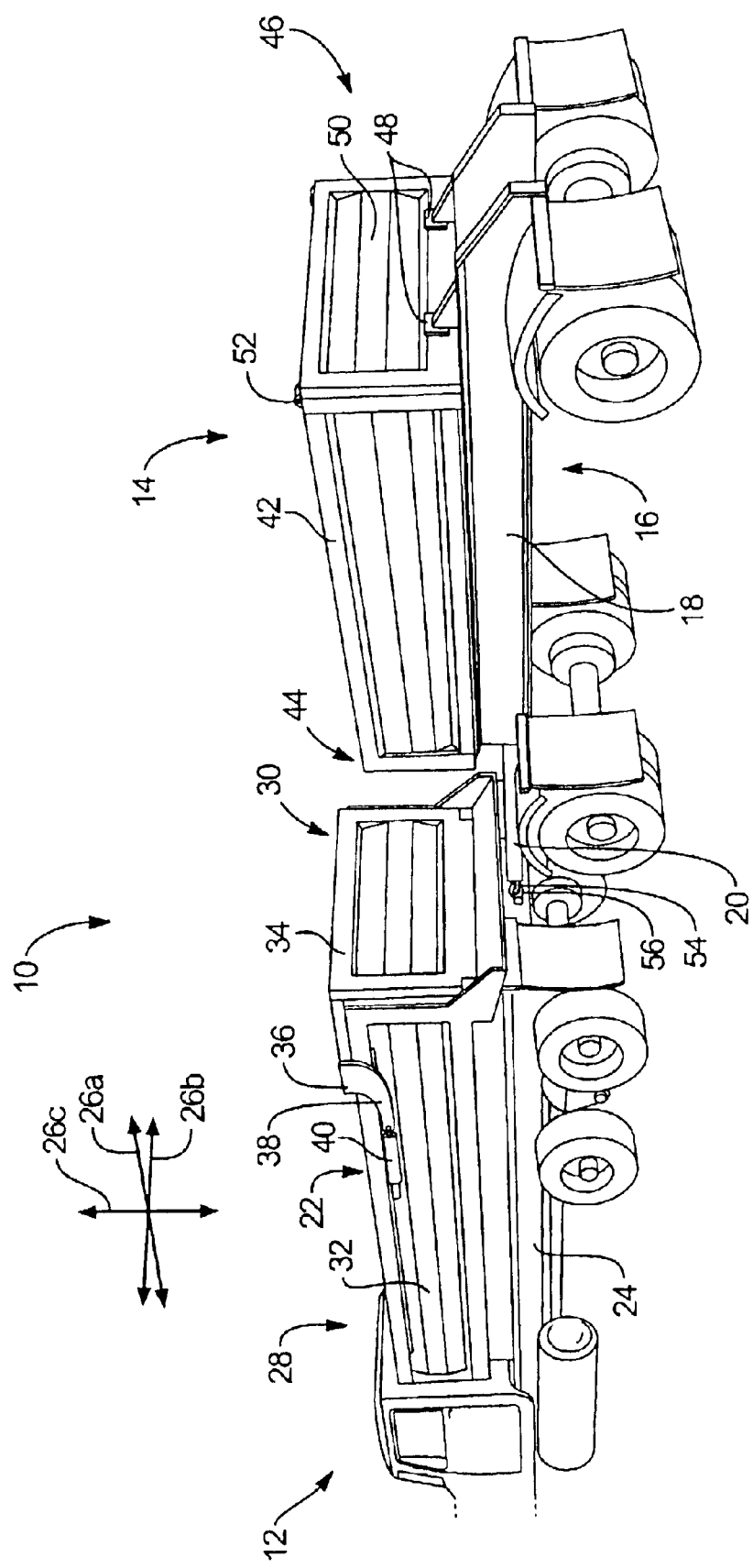
FIG. 1 is a perspective view of a transfer system in accordance with the invention.

Referring to FIG. 1, an apparatus 10 may comprise a truck 12 and a transfer module 14. The transfer module 14 may rest on a support 16. The support 16 may be embodied as a trailer 18 towable by a truck 12. In certain embodiments the trailer 18 may have a draw bar 20 secured to the trailer 18. The draw bar may serve to couple the trailer 18 to the truck 12. The truck 12 may have a body 22 secured to a frame 24.

A longitudinal direction 26a may be defined as being parallel to the direction of travel of a truck 12. A lateral direction 26b may be defined as being substantially parallel to a supporting surface under the truck 12 and perpendicular to the longitudinal direction 26a. A transverse direction 26c may be defined as being substantially orthogonal to both the longitudinal direction 26a and the lateral direction 26b. The transverse direction 26c may be substantially equivalent to the vertical direction when the truck 12 is on a level surface. Accordingly, a transverse direction 26c may also be referred to as a nominally vertical direction 26c (e.g. nominally up or down), or a nominally vertical axis 26c, The directions 26a–26c may also be considered to be axes 26a–26c, accordingly rotation may be defined in terms of rotation about an axis parallel to an axis 26a–26c.

The truck 12 may define a forward end 28 and a rearward end 30. In certain embodiments the truck body may be embodied as a dumping body 32, or dump-truck body 32, having a tailgate 34. The tailgate 34 maybe secured to the body 32 by pivots 36. An arm 38 may be secured to the tailgate 34 and to an actuator 40. The actuator 40 may be used to open the tailgate 34 to facilitate dumping.

In certain embodiments the transfer module 14 maybe embodied as a dumping body 42. The dumping body 42 may have a forward end 44 and a rearward end 46. The trailer 18 may have stops 48 formed to engage the rearward end 46 of the trailer 18 to prevent the body 42 from sliding off the trailer 18. The body 42 may also have a tailgate 50 secured to the body 42 by pivots 52. In certain embodiments the draw bar 20 may have a pintle ring 54 secured thereto. The pintle ring 54 may engage a pintle hitch 56 secured to the truck 12.

Figure 2:
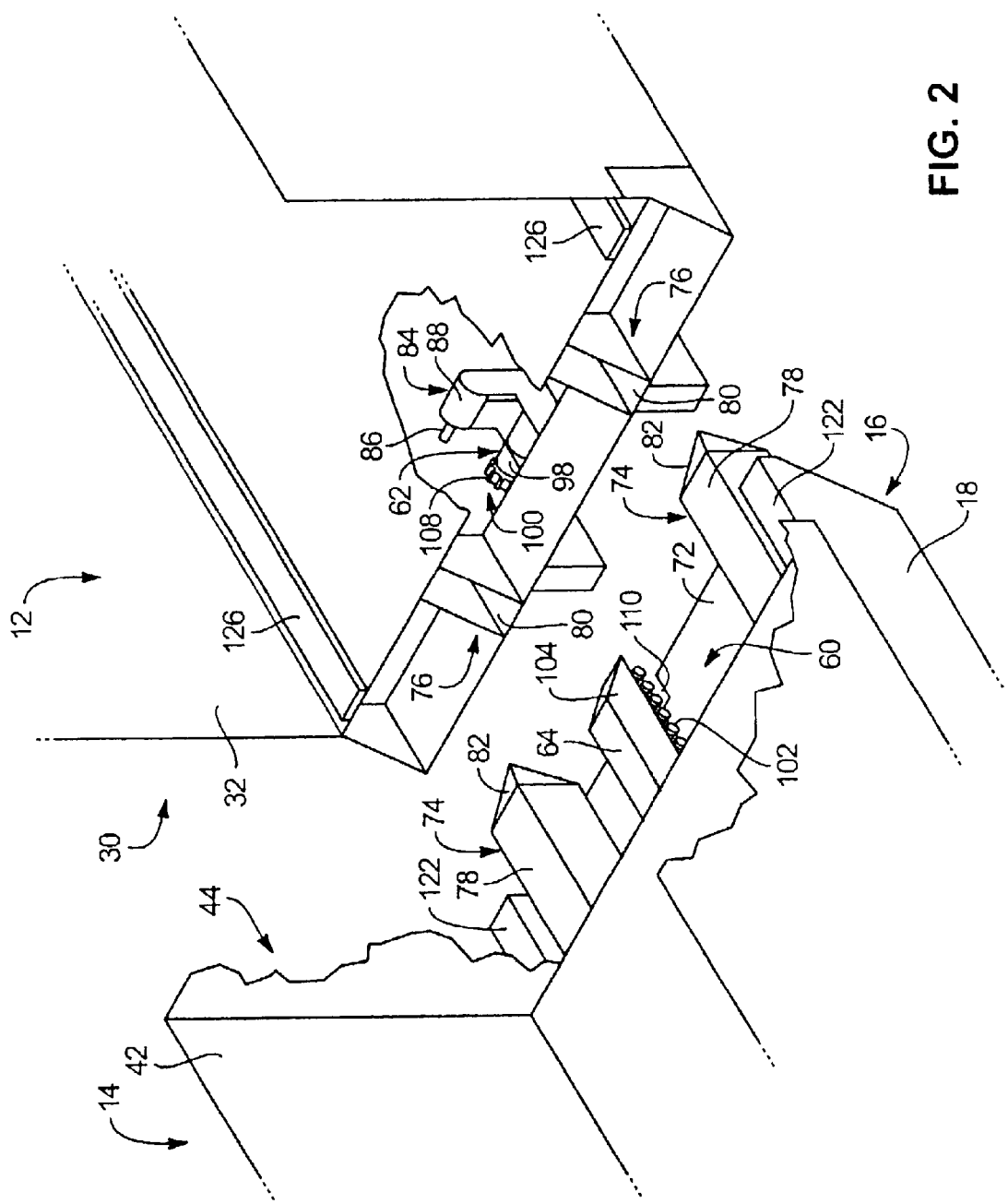
FIG. 2 is a perspective cutaway view showing components of the transfer system m accordance with the invention.
Figure 3:
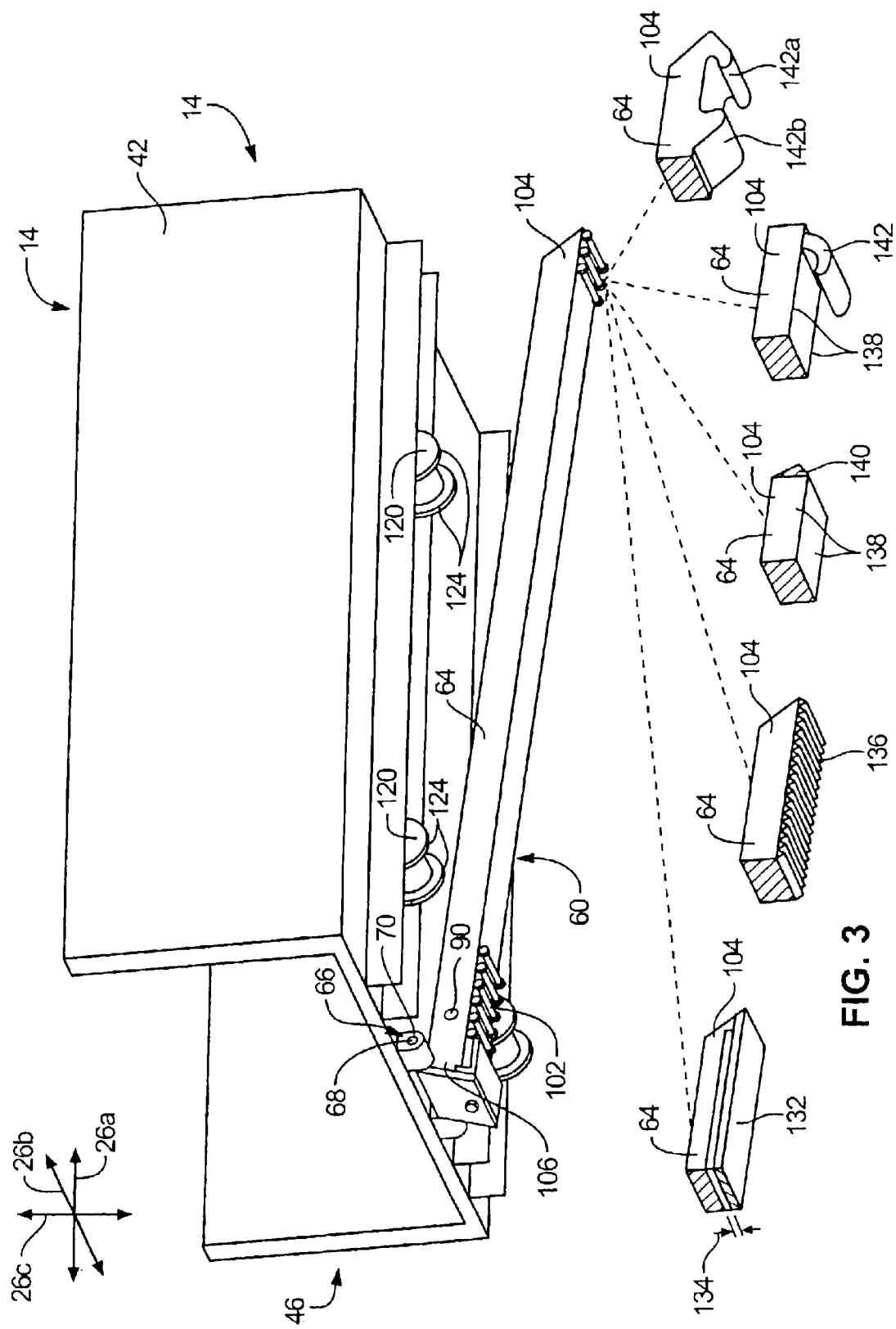
FIG. 3 is lower quarter perspective view of a transfer module and track with various alternative track embodiments in accordance with the invention.

Referring to FIGS. 2 and 3, in certain embodiments the transfer module 14 may have a track 60 secured thereto. The track 60 may engage a driver 62 secured to the truck 12. In certain embodiments, the track 60 maybe secured to a pull bar 64 secured to the rearward end 46 of the transfer module 14 and extending toward the forward end 44. In certain embodiments the pull bar 64 may be secured to the transfer module 14 by means of a pivot 66. A pivot 66 may be embodied as a bolt 68 or pin 68, or other structure 68, extending through apertures 70 in the transfer module 14 and through the pull bar 64. Alternatively, a pivot 66 may be embodied as studs 68, or a pin 68, either fixedly or pivotably secured to the pull bar 64 and extending through an aperture 70 or apertures 70 in the transfer module 14. A rest 72, or restraint 72, may be secured to the support 14 to support the pull bar 64, capturing the pull bar 64 and preventing the pull bar 64 from falling further toward the ground. The pull bar 64 may rotate, or pivot, about a number of axes, for example, the pull bar 64 may pivot about an axis substantially parallel to a lateral axis 26b.

The support 16 may have registration members 74 secured thereto, which may engage registration members 76 secured to the truck 12. The registration members 74, 76 may serve to ensure adequate alignment of the truck 12 and transfer module 14 when the transfer module 14 is being transferred on to and off of the support 16. The registration members 74, 76 may align the truck 12 and transfer module 14 in the longitudinal direction 26a and the lateral direction 26b. In certain embodiments the registration members 70 may be embodied as a horn 78, or horns 78, extending from the forward end 44 of the support 16 along a longitudinal direction 26a. The horn 78, or horns 78, may engage receivers 80 shaped to permit insertion of a horn 78 while still substantially forcing alignment of the truck 12 and transfer module 14. In certain embodiments, a horn 78 may have a tapered end 82 to serve as a pilot to accommodate misalignment during insertion into a receiver 80.

In certain embodiments a lock 84 may secure to the truck 12 and lock the transfer module 14 to substantially fix its position relative to the truck 12. The lock 84 may comprise a pin 86 actuated by a hydraulic piston 88, pneumatic piston 88, or the like. The pin 86 may insert into an aperture 90 formed in the transfer module 14. In one embodiment, the aperture 90 may be formed in the pull bar 64.

The driver 62 may be embodied as a motor 98, such as a hydraulic motor 98, electric motor 98, pneumatic motor 98, or the like, having a drive wheel 100. In certain embodiments the track 62 maybe embodied as either a rigid or flexible member 62, such as a rack or a chain 102. The chain 102 may be secured along the length of the pull bar 64, or may be secured only near the free end 104 and near the secured end 106 of the pull bar 64. Accordingly the drive wheel 100 may be embodied as a sprocket 108 for engaging the chain 102. The rest 72 may have a notch 110 to facilitate engagement of the sprocket 108 with the chain 102.

In certain embodiments, the transfer module 14 may have rollers 120 secured thereto to facilitate transfer of the transfer module 14. The support 14 may have rails 122 to guide the transfer body 14 during transfer. Accordingly, the rollers 120 may have flanges 124 to maintain the rollers on the rails 122. The truck 12 may likewise have rails 126, along which the rollers 120 may roll. Alternatively, the transfer module 14 may simply be dragged onto the truck 12 without the benefit of rails 122, 126, rollers 120, or both.

The track 60 may have various embodiments. For example, the track 60 may be a belt 132 secured near the free end 104 and near the secured end 106 of the pull bar 64. The belt 132 may be secured at a distance 134 from the pull bar 64 in order to permit the insertion of a roller (e.g. idler) or other mechanism to increase friction between the drive wheel 100 and the belt 132.

The track 60 may also be embodied as a rack 136 formed along the pull bar 64. Alternatively, the track may be a surface 138, or surfaces 138, formed on the pull bar 64 for engaging the drive wheel 100. The pull bar 64 may have a tapered end 140 to facilitate initial engagement with the drive wheel 100 and to accommodate misalignment between the pull bar 64 and the drive wheel 100. The surface 138, or surfaces 138, maybe toothed, perforated, stepped, textured, roughened, coated, treated, or the like to enhance friction between a surface 138 and the drive wheel 100. In certain embodiments the track 60 may be mounted to the truck 12. Accordingly the pull bar 64 may have a hook 142a, hooks 142a and 142b, or a ring 142, aperture 142, or other structure 142 for engaging a track 60.

Figure 4:
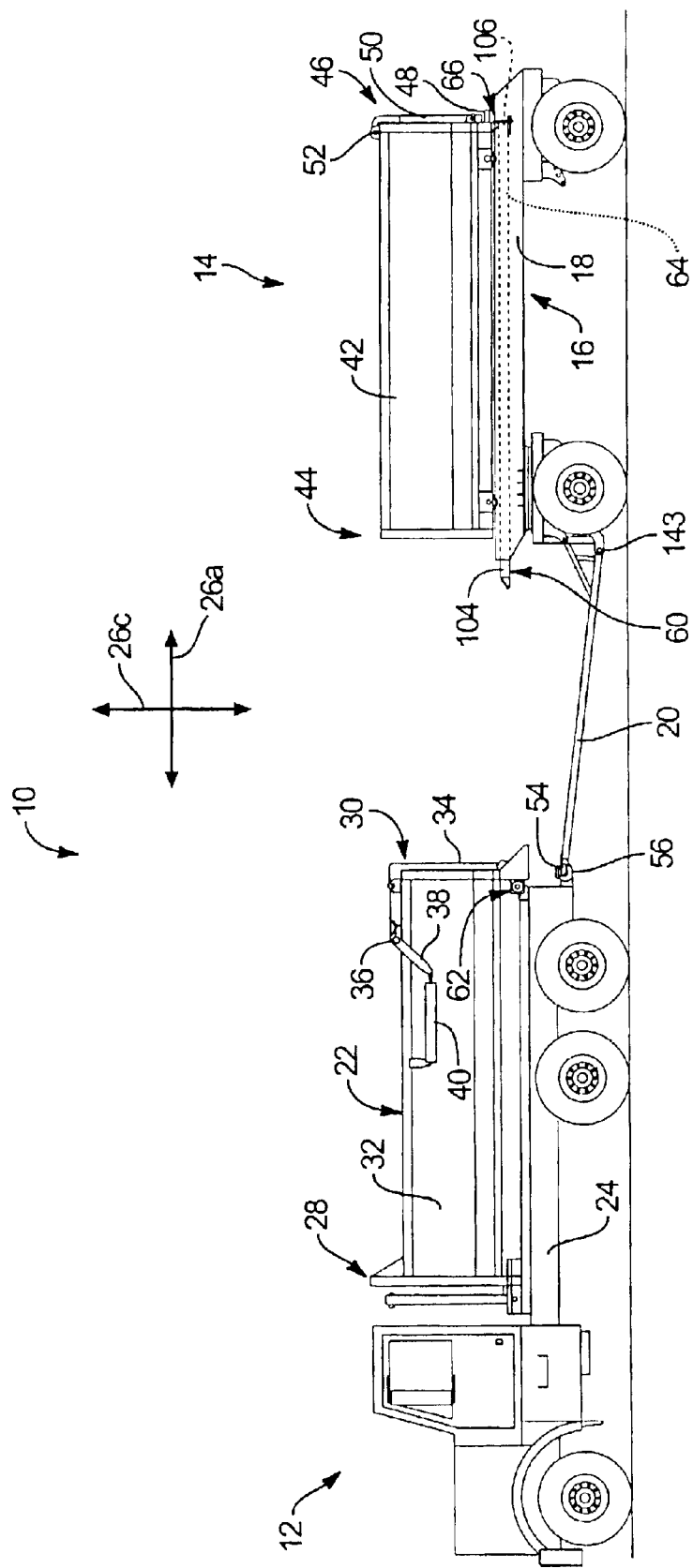
FIGS. 4 is a side elevation view of a transfer system in accordance with the invention.
Figure 5:
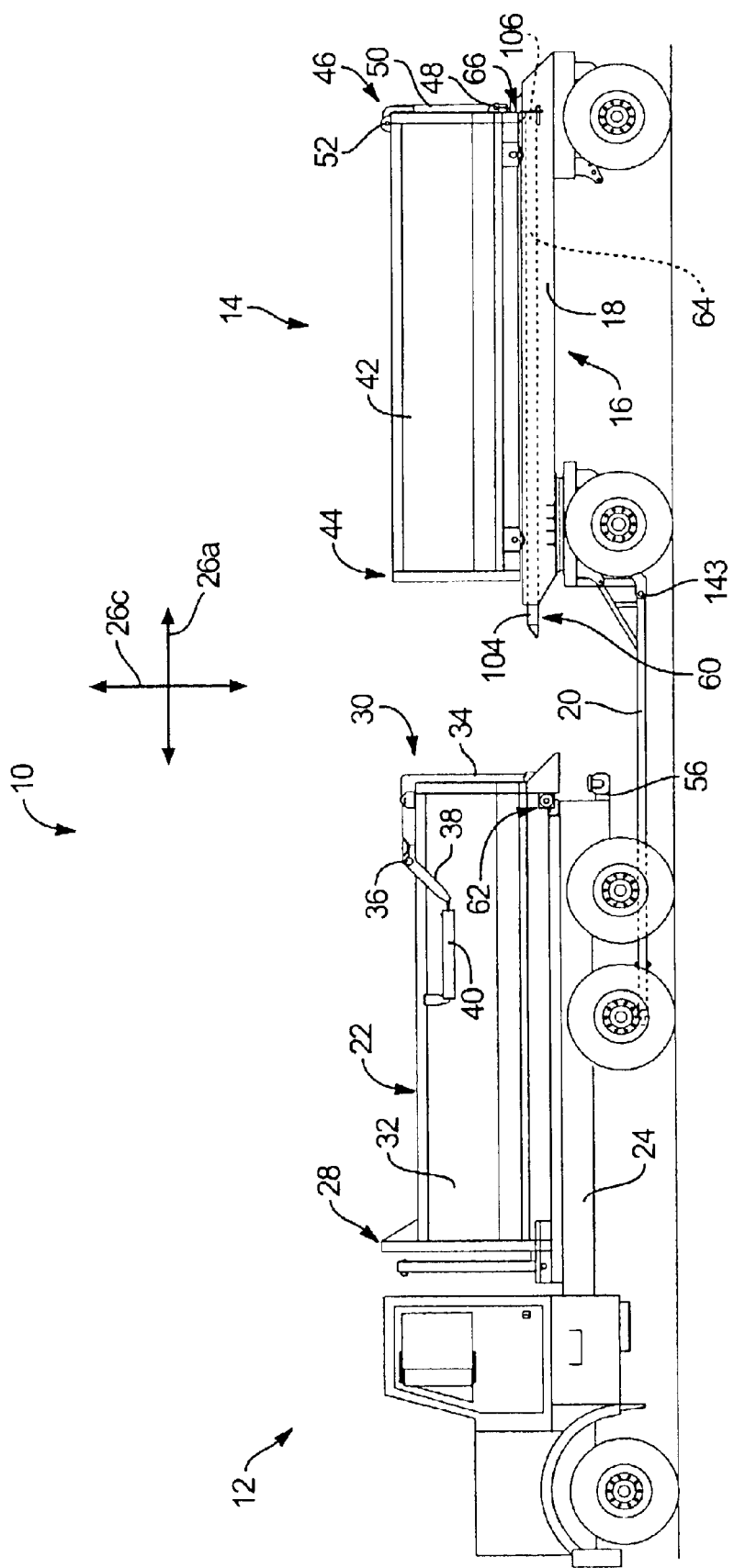
FIG. 5 is a side elevation view of a transfer system with the trailer and draw bar oriented in preparation for engagement of the truck and support in accordance with the invention.

Referring to FIGS. 4 and 5, a draw bar 20 may be secured to a trailer 18 by a pivot 143 allowing the draw bar 20 to be positioned as shown in FIG. 4 when towing a trailer 18, and positioned as shown in FIG. 5 when transferring a transfer module 14 onto the truck 12. During the process of transferring a transfer module 14, the truck 12 and trailer 18 are typically positioned relative to one another as shown in FIG. 4. An operator may detach the pintle ring 54 from the hitch 56 and pivot the draw bar 20 out of the way into the position of FIG. 5. The operator will then back the truck toward the support 14 as shown in FIG. 5.

Figure 6:
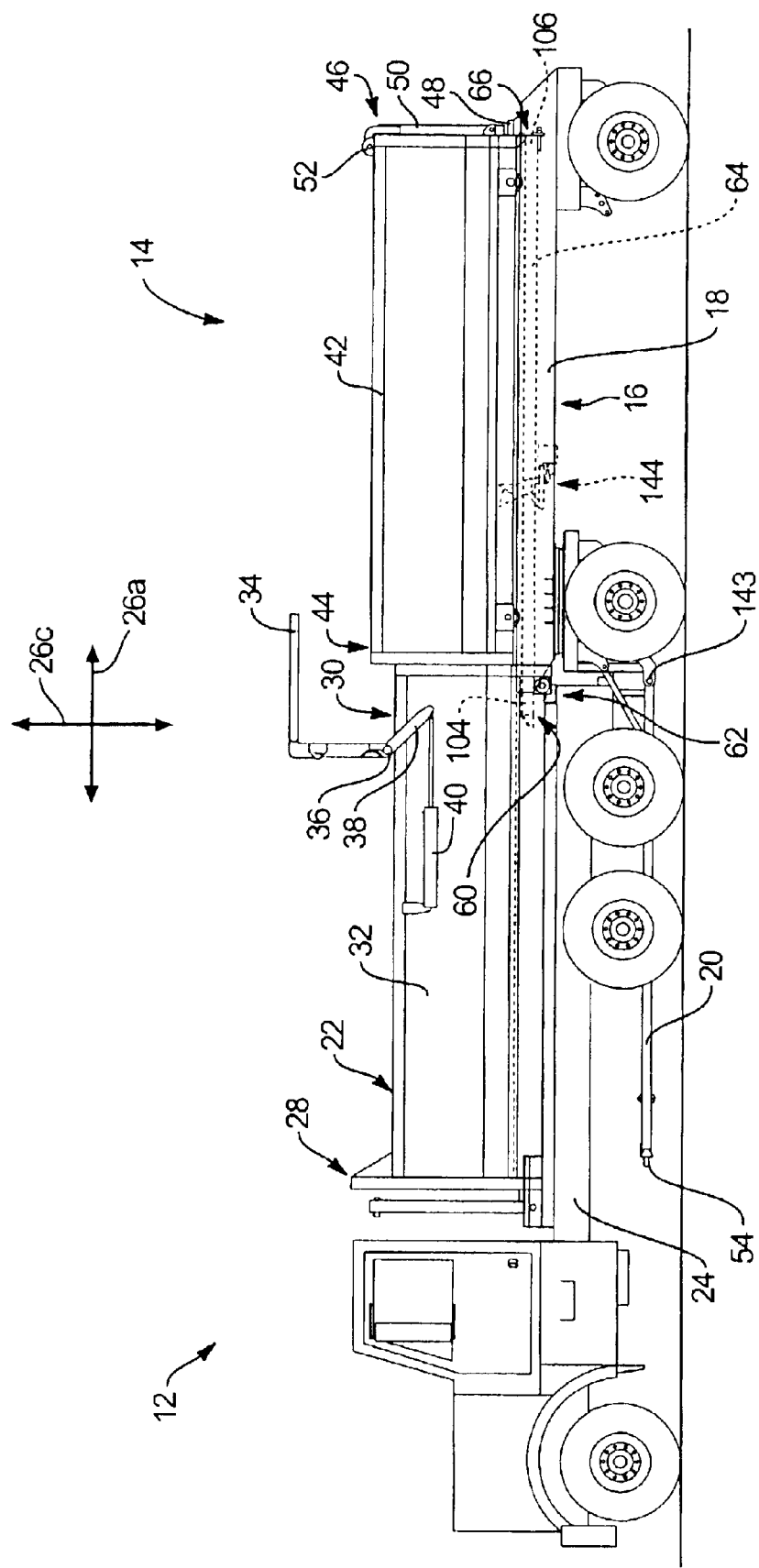
FIG. 6 is a side elevation view of a transfer system with the truck and support engaged with one another in accordance with the invention.

Referring to FIG. 6, the operator may back the truck 12 toward the support 14 such that the horns 78 insert into the receivers 80. The track 60 is then positioned proximate the driver 62. For embodiments having a driver 62 embodied as a hydraulic motor 98, the motor hydraulics may be switched to allow the drive wheel 100 to spin freely as the free end 104 of the draw bar 64 is forced over the drive wheel 100 during insertion.

A trailer lock 144 may function in conjunction with the stops 48 to secure the transfer module 14 to the trailer 18. In certain embodiments the trailer lock 144 may automatically lock the transfer module to the trailer 18 upon transfer of the transfer module 14 onto the trailer 18. The lock 144 may also be configured to automatically disengage the transfer module 14 when a truck 12 backs up against the trailer 18. Alternatively the lock 144 maybe manually disengaged when the transfer module 14 is being transferred off the support 16.

Figure 7:
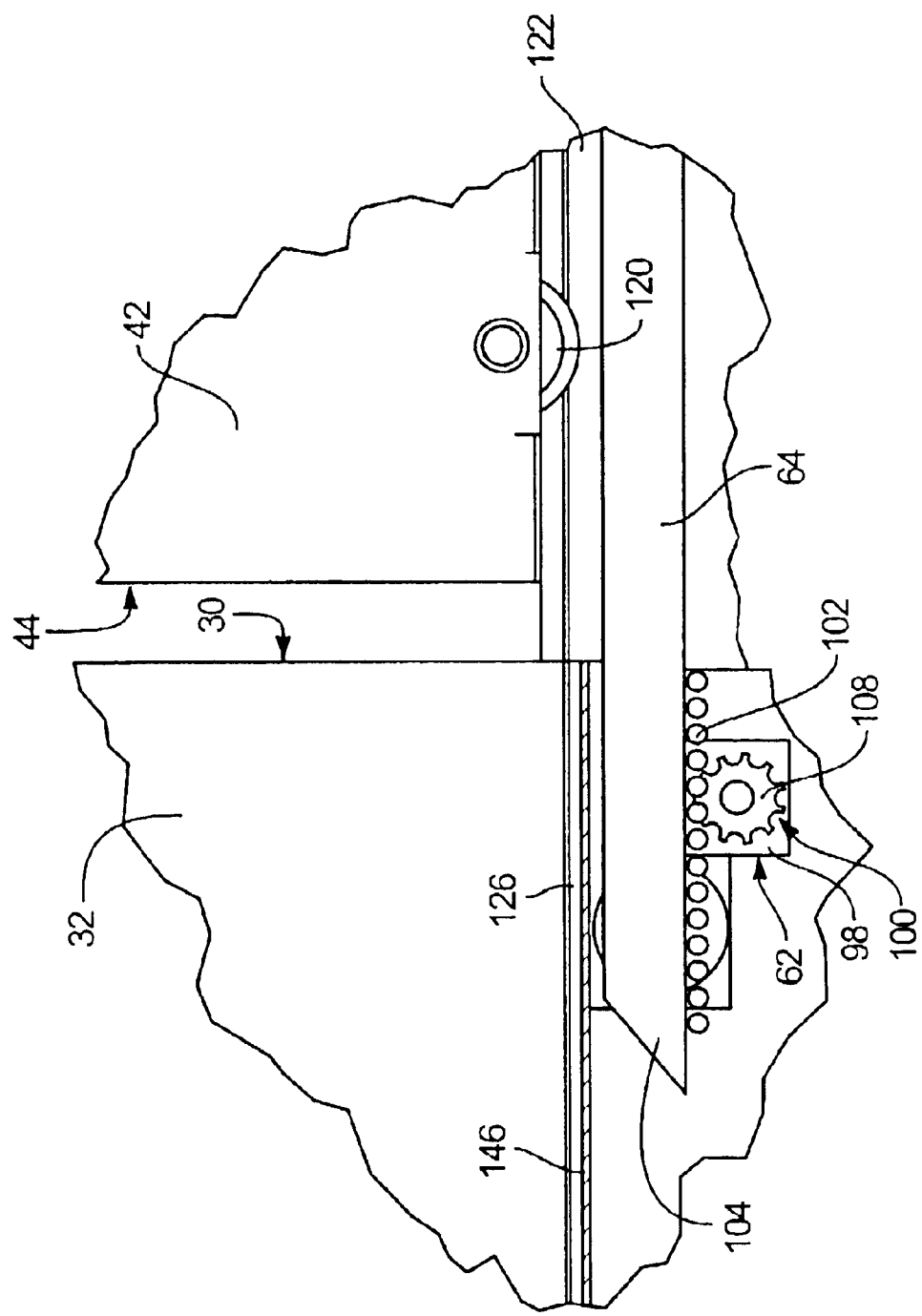
FIG. 7 is a partial cutaway side elevation view detailing the disposition of various components of the transfer system when engaged in accordance with the invention.

Referring to FIG. 7, with the truck 12 positioned relative to the transfer module 14 as shown in FIG. 6, the pull bar 64 may be positioned over the driver 62. The track 60 may also engage the drive wheel 100. For embodiments of the apparatus 10 having a drive wheel 100 embodied as a sprocket 108, the pivoting of the draw bar 64 relative to the transfer module 14 may allow the free end 104 of the pull bar 64 to be forced up over the teeth of the sprocket 108 and then fall down toward the sprocket 108 with the chain 102 engaged with the teeth of the sprocket 108. In embodiments of the apparatus 10 having a truck body 22 embodied as a dumping body 32, the driver 62 is typically positioned below the floor 146 of the body 32. This may be the case for other embodiments of a truck body 22 having a continuous floor 146 that cannot conveniently have transfer hardware such as a driver 62 secured thereto.

Figure 8:
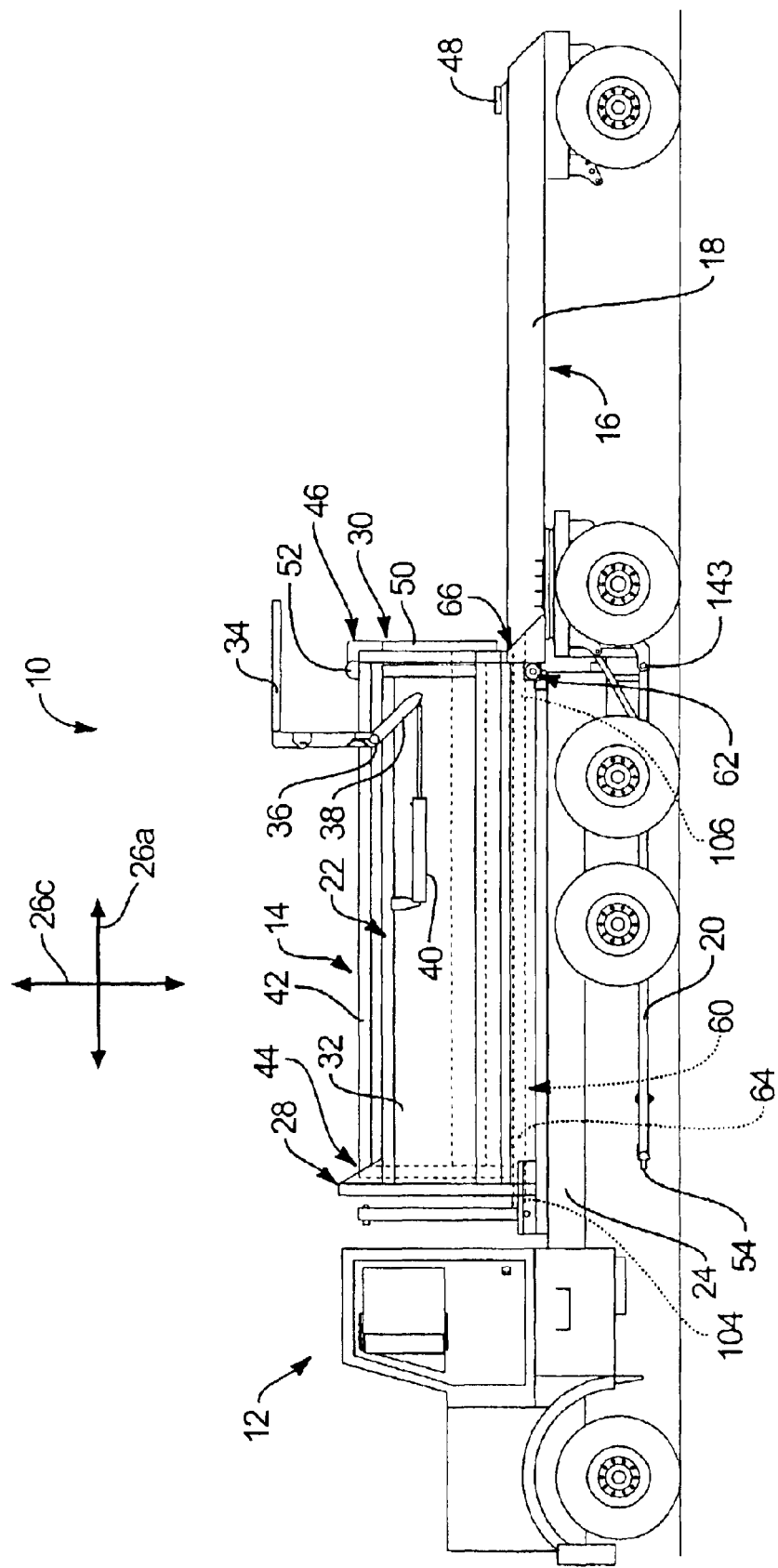
FIG. 8 is aside elevation view of a transfer system with the transfer module loaded onto the truck in accordance with the invention.
Figure 9:
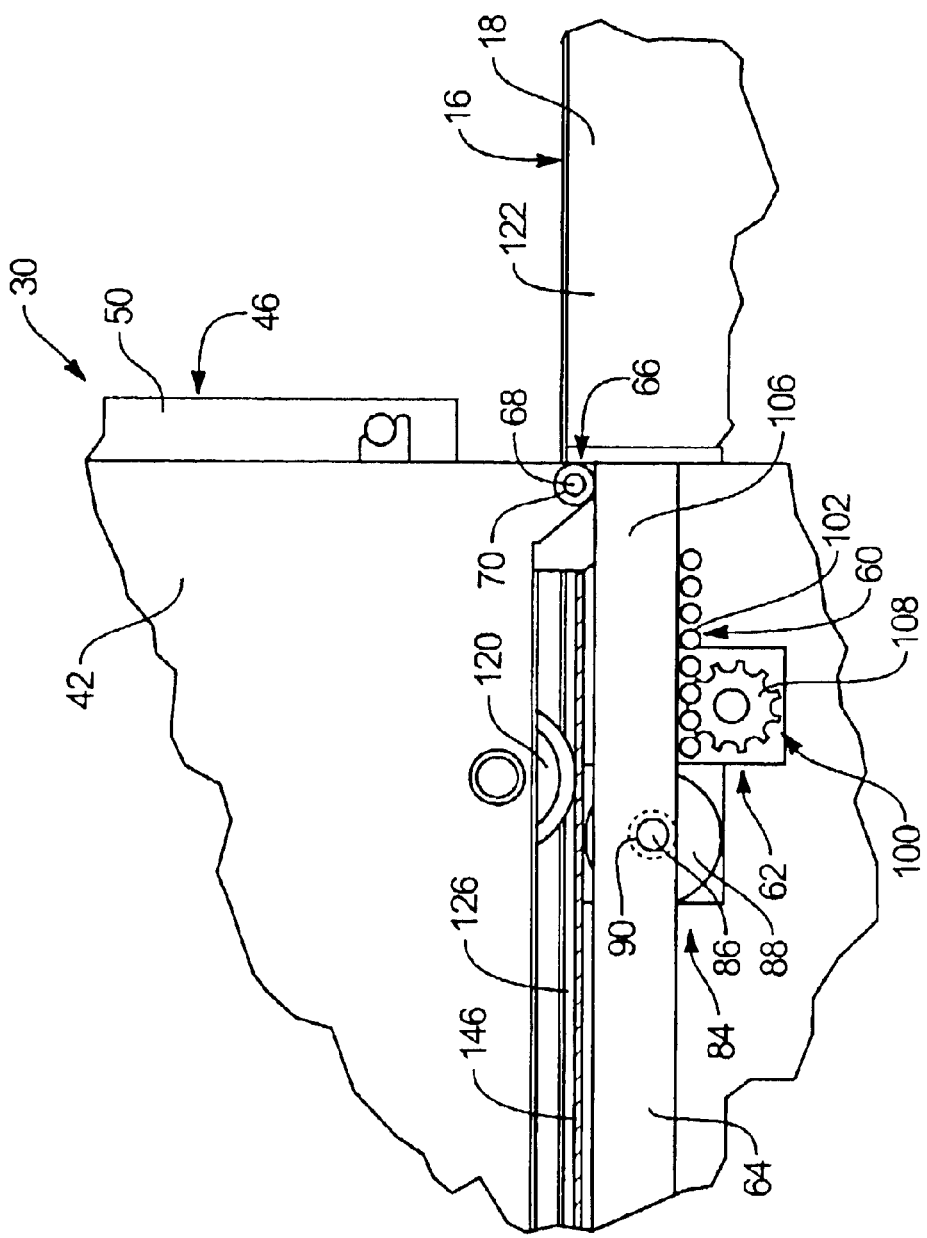
FIG. 9 is a partial cutaway side view detailing the disposition of the various components of the transfer system when the transfer module is loaded onto the truck.

Referring to FIGS. 8 and 9, the driver 62 may be activated to exert a force on the track 60 to draw the transfer module 14 onto the truck 12 as shown in FIG. 8. The lock 84 maybe activated during the transfer of a transfer module 14 into a truck 12. The lock 84 may be continuously activated during the transfer process without effectively locking the position of the transfer module 14 into the truck 12 until the transfer module 14 is substantially completely transferred.

In embodiments of the apparatus 10 having a locking pin 86 actuated by a piston 88, the piston 88 may push the pin 86 against a structure of the transfer module 14, allowing the transfer module 14 to slide by until a locking aperture 90 reaches a position near the piston 88. The piston 88 may then force the pin 86 into the aperture 90 effectively locking the transfer module 14 into the truck 12.

In embodiments of the apparatus 10 wherein the locking aperture 90 is formed in the draw bar 64, the locking pin 86 may slide along the draw bar 64 as the transfer module 14 is being transferred into the truck 12 until the locking aperture 90 is positioned such that the pin 86 inserts into the locking aperture 90, as shown in FIG. 9. As shown in FIG. 9, for truck bodies 12 having continuous floors 146 the pull bar 64 is typically drawn into the envelope of the truck underneath the floor 146 while the transfer module 14 is drawn into the envelope of the truck above the floor 146.

Figure 10:
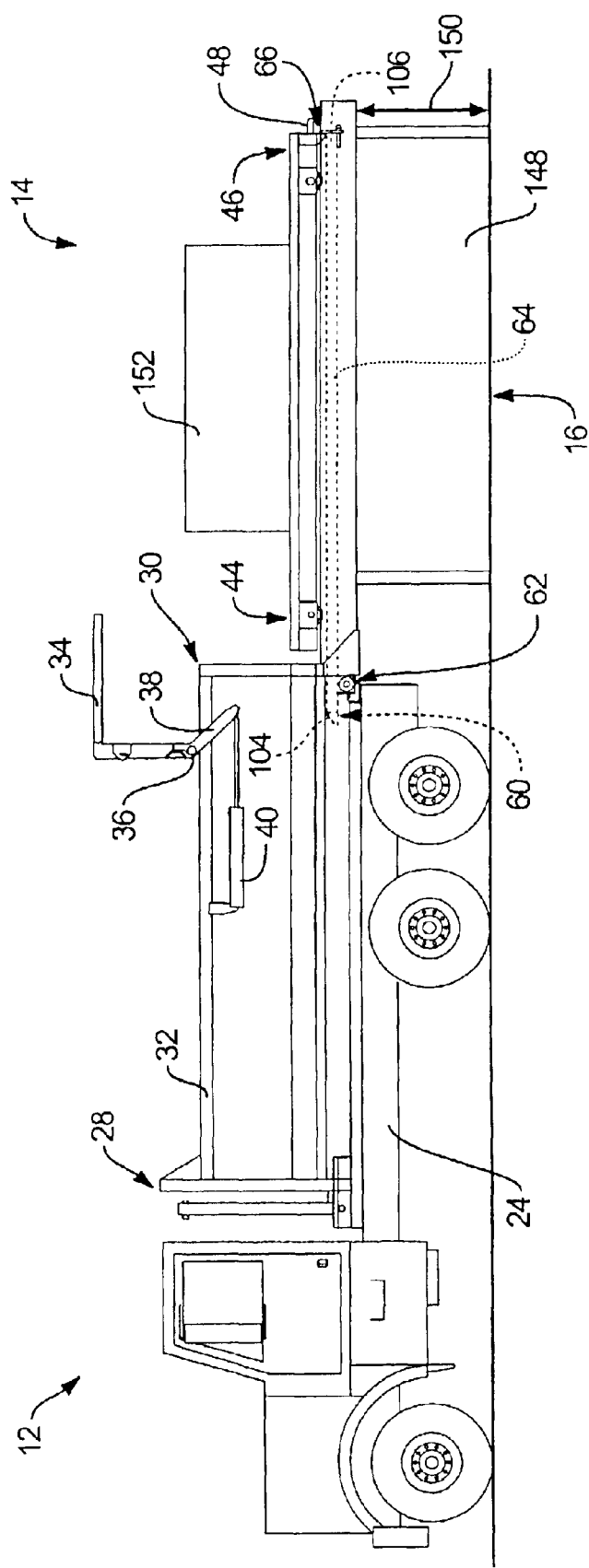
FIG. 10 is a side elevation view of a transfer system having an alternative embodiment of a support in accordance with the invention.

Referring to FIG. 10, a support 16 maybe embodied as a pedestal 148. A pedestal 148 may allow transfer modules 14 to be stored at a height 150 such that they may be loaded into a truck 12 in the same manner as a transfer module 14 stored on a trailer 18. In this manner a municipality, or other organization or individual, may purchase a single truck 12 and have several types of transfer modules 14 stored on pedestals 148. A transfer module 14 may have any one of several functionalities and may accordingly be embodied as a spreader 152, dumpster 152, container 152, garbage-truck body 152, crane 152, or the like. In this manner an organization may derive more functionality from a single truck 12.

Figure 11:
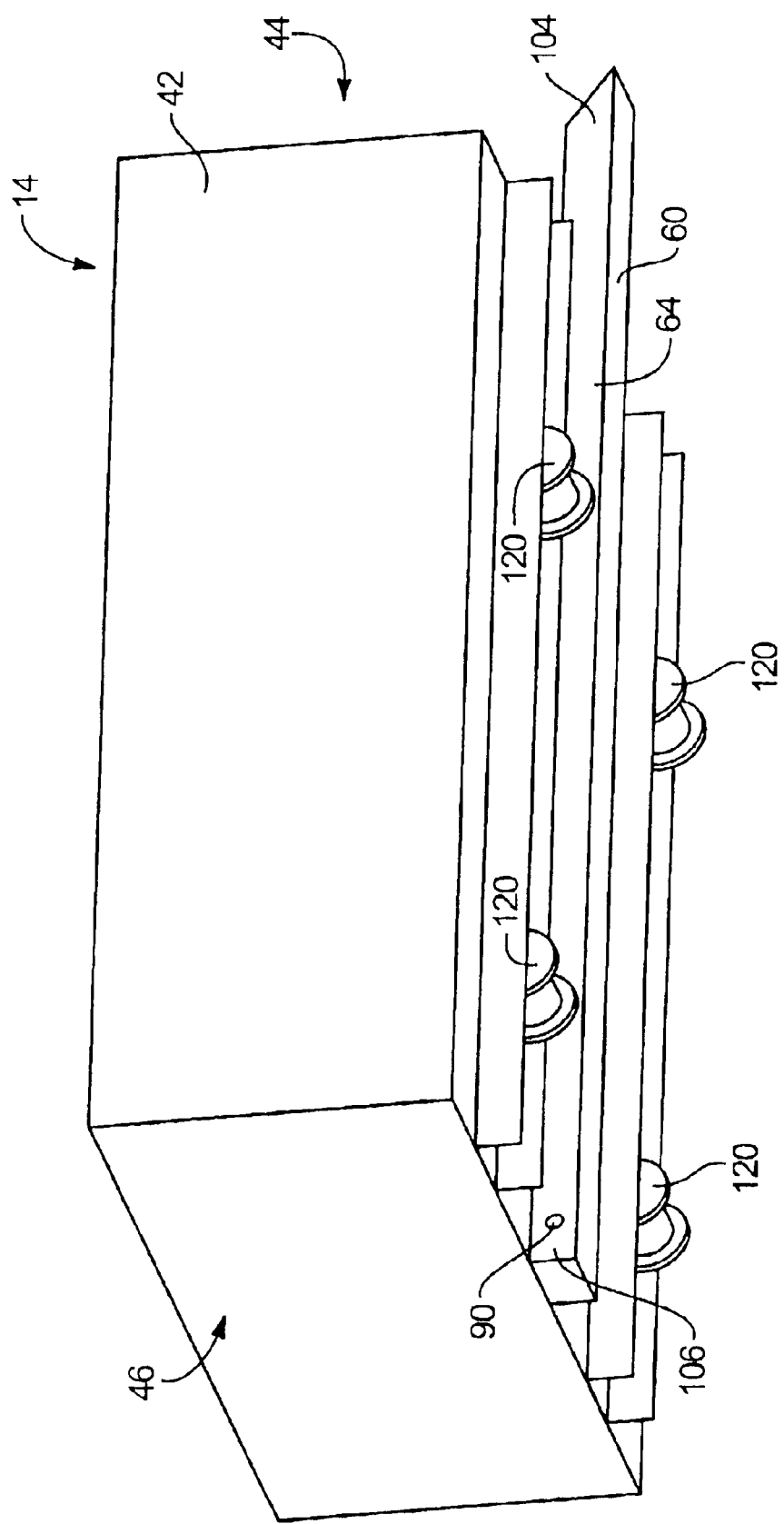
FIG. 11 is a bottom, rear quarter perspective view of an alternative embodiment of a track and pull bar in accordance with the invention.
Figure 12:
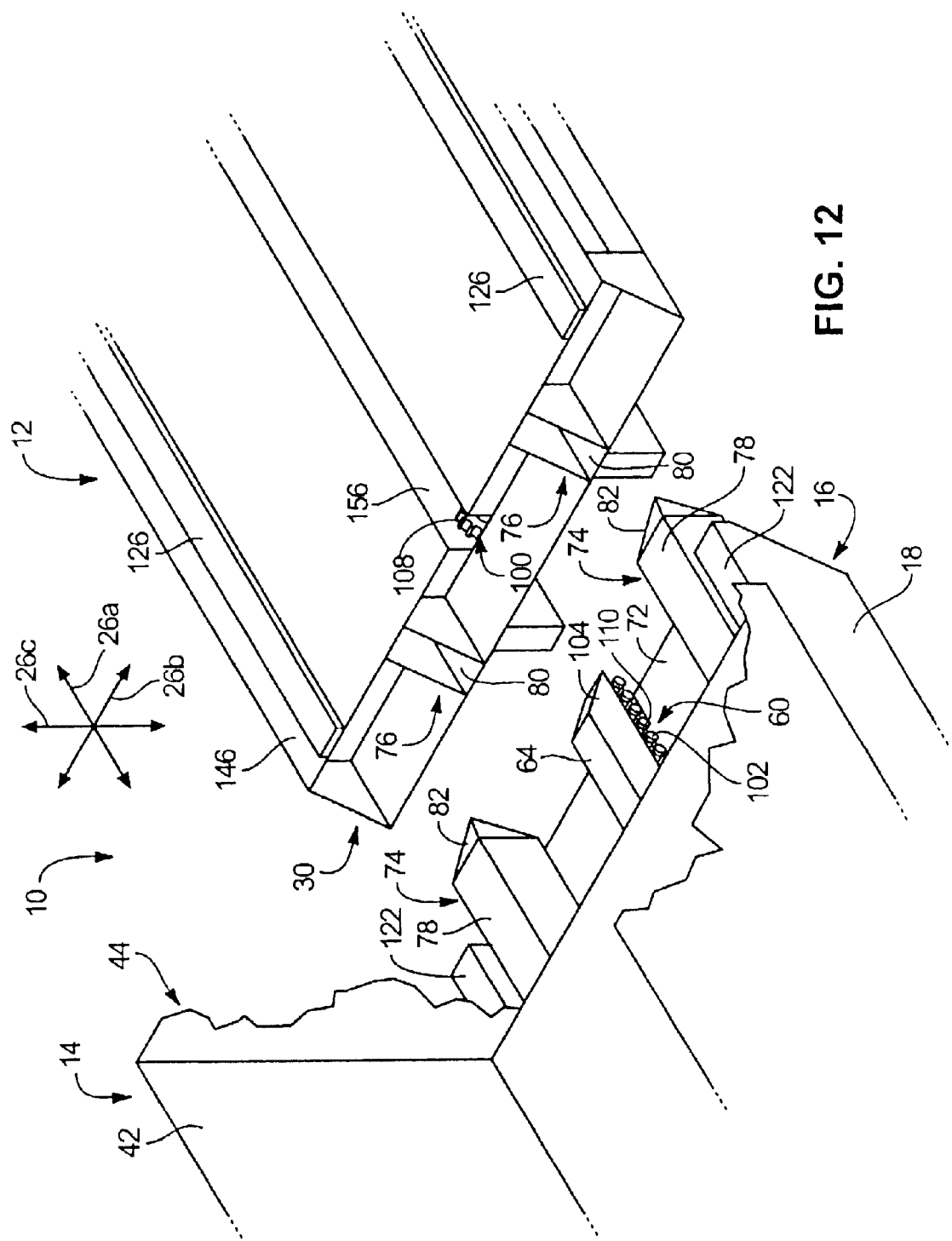
FIG. 12 is a is a perspective cutaway view showing an alternative embodiment of a truck body in accordance with the invention.
Figure 13:
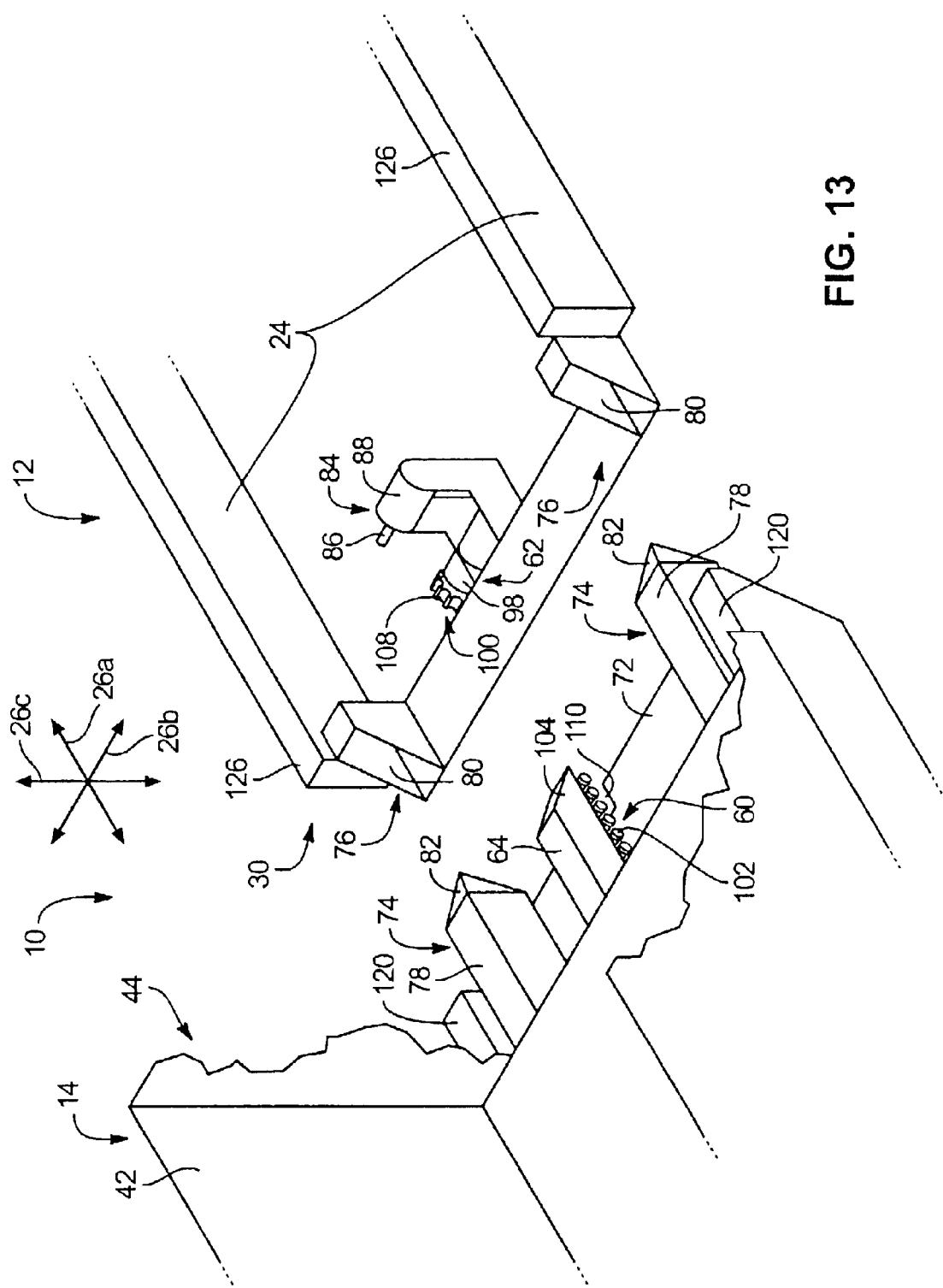
FIG. 13 is a cutaway perspective view of a transfer system which does not have a dumping body secured to the truck.
Figure 14:
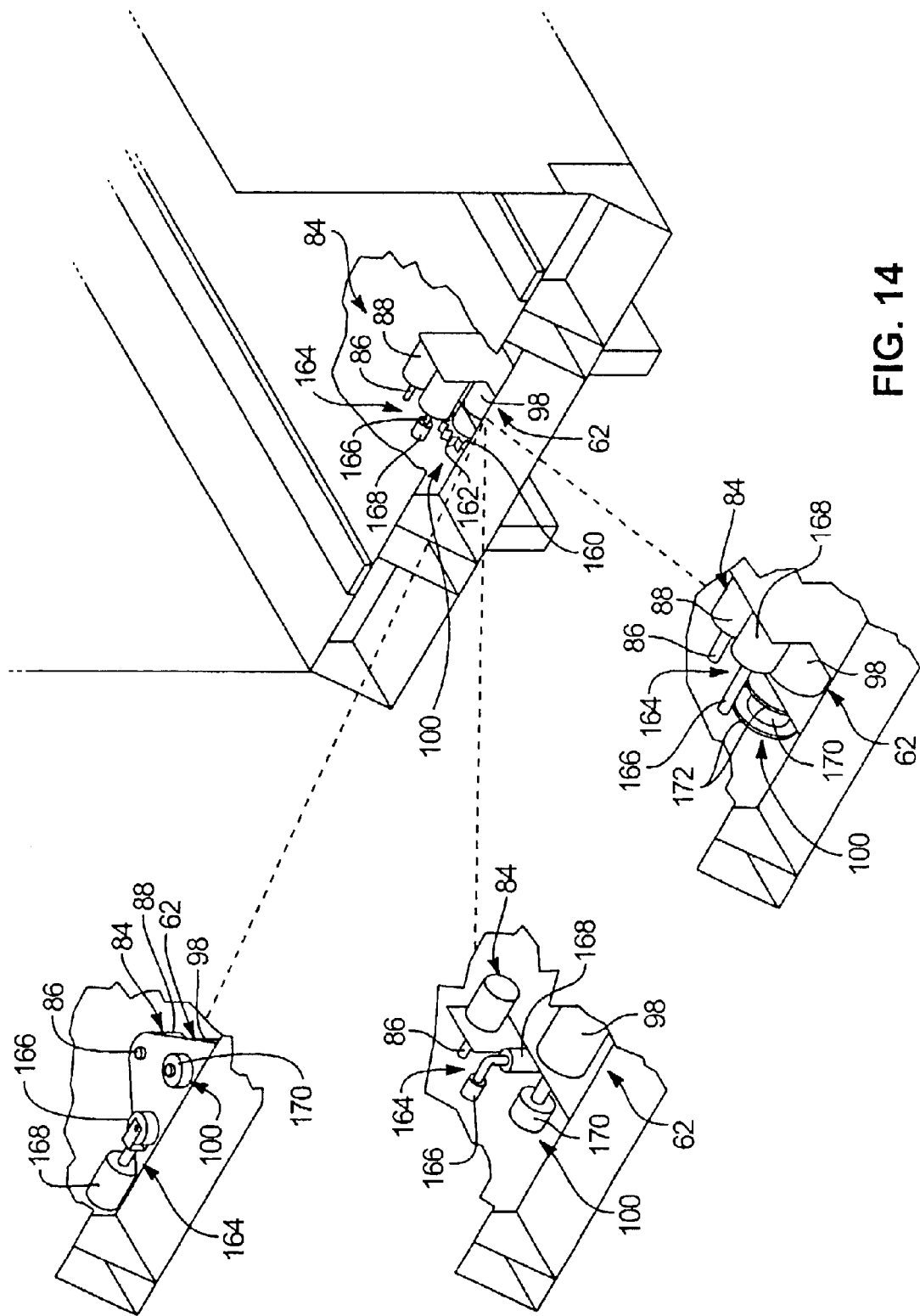
FIG. 14 is a cutaway perspective view showing alternative embodiments for a driver in accordance with the invention.

Referring to FIGS. 11–13, the pull bar 64 maybe disposed in a variety of configurations. For example, the pull bar 64 maybe fixedly, rather than pivotably, secured to the transfer module 14. The pull bar 64 shown in FIG. 11 may also be formed without a chain 102, but may rather have a surface 138, or surfaces 138, for engaging a drive wheel 100. A floor 146 of a truck body 32 may have a channel 156 formed therein as in FIG. 11. The channel 156 may accommodate a pull bar 64 that is fixedly secured to the transfer module 14.

Alternatively a truck 12 may not have a floor 146, but rather, merely a frame 24 having rails 126, as shown in FIG. 12.

Referring to FIG. 13, a driver 62 may be disposed in a variety of configurations. For example, a driver 62 may have a drive wheel 100 embodied as a gear 160 having involute gear teeth 162 suitable for engaging a track 60 embodied as a rack 136. The normal operation of a gear 160 having involute gear teeth 162 results in a force exerted on the mating gear directed from the axis of rotation of the gear 160 toward the point of contact with the mating gear teeth.

Accordingly, a retainer 164 may be needed to maintain the rack 136 in contact with the gear 162. A retainer 164 may be embodied as a roller 166 spaced apart from the drive wheel 100, such that the draw bar 64 extends between the drive wheel 100 and roller 166 with the roller 166 urging the draw bar 64 into the drive wheel 100 during transfer of a transfer module 14.

A roller 166 may have an actuator 168, such as a piston 168, solenoid 168, or the like. The actuator 168 maybe activated to position the roller 166 opposite the drive wheel 100 during transfer and moved out of the way of the free end 104 of the pull bar 64 during insertion.

A track 60 may be embodied as a belt 132. Accordingly, a drive wheel 100 may be embodied as a drive roller 170. A roller 166 may be used to press the belt 132 against the roller 170. The roller may insert between the pull bar 64 and the belt 132. An actuator 168 may be used to move the roller 166 out of the way of the pull bar 64 during insertion and between the pull bar 64 and the belt 132 during transfer. A drive roller 170 may have flanges 172 to maintain the belt 132 substantially centered on the drive roller 170.

In certain embodiments of an apparatus 10, the track 60 maybe embodied as surfaces 138 formed on the pull bar 64. Accordingly, the drive wheel 100 may be embodied as a drive roller 170. A retainer 164 maybe used to press the pull bar 64 onto the drive wheel 100. The retainer 164 may move the roller 166 along a substantially transverse direction 26c. Thus the force exerted on the pull bar 64 can be controlled using the actuator 168.

In certain uses the transfer of a transfer module 14 into or out of a truck may take place on uneven terrain. Accordingly, the transfer module 14 may not be adequately aligned with the truck 12. The support 16 may likewise be at an angle relative to the truck 12. Such variability in orientation may cause variations in the angle that the pull bar 64 makes with the truck 12.

A roller 166 positioned a fixed distance away from the drive wheel 100 may be able to accommodate only small variations in the angle of the pull bar 64 relative to the truck 12. An actuator 168 that has a range of motion parallel to a transverse direction 26c enables the application of a force to urge the draw bar 64 onto the drive wheel 100. In the case where the draw bar is at an angle with respect to the truck, the actuator 168 may be forced to move the roller 166 in order to accommodate the angle. However, because the motion of the draw bar 64 is parallel to the direction of motion of the actuator 168, no bending or breakage of hardware results.

For example, an actuator 168 maybe a hydraulic piston 168. Application of pressurized hydraulic fluid to the piston will result in a constant force exerted on the pull bar 64. Should the pull bar 64 be angled wrong it will exert a force on the roller 166. If the force exerted by the pull bar 64 is greater than the force exerted by the piston 168, the piston 168 will merely be extended from its cylinder until the force exerted by the pull bar 64 on the roller is equal to the force exerted by the hydraulic piston 168.

An actuator 168 may also be a biasing spring 168 that urges the roller onto the drive wheel 100. The free end 104 of the pull bar 64 may have a tapered end 140 such that the pull bar 64 may be piloted between the roller 166 and the drive wheel 100 when the truck 12 is backed up to the support 16.

Alternatively, the weight of the pull bar 64 maybe sufficient to maintain the urge the pull bar 64 against the drive wheel 100 such that enough friction is developed between the track 60 and drive wheel 100 to enable the drive wheel 100 to transfer force to the transfer module 14 effective to move the transfer module 14 to and from the truck 12. In some embodiments the weight of the pull bar 64 maybe enough to maintain a rack 136 in mating engagement with a gear 160 even while the gear 160 is driving the rack 136.

The driver 62 and lock 84 maybe disposed in a variety of configurations. For example, the axis of rotation of the drive wheel 100 of the driver 62 may be substantially parallel to a transverse axis 26c. An actuator 168 may, accordingly, move substantially in a lateral direction 26b. The lock 84 may rely on a piston 88 to move the locking pin 86 along a transverse direction 26c, accordingly the locking aperture 90 may extend through the pull bar 64 in a transverse direction 26c.

Figure 15:
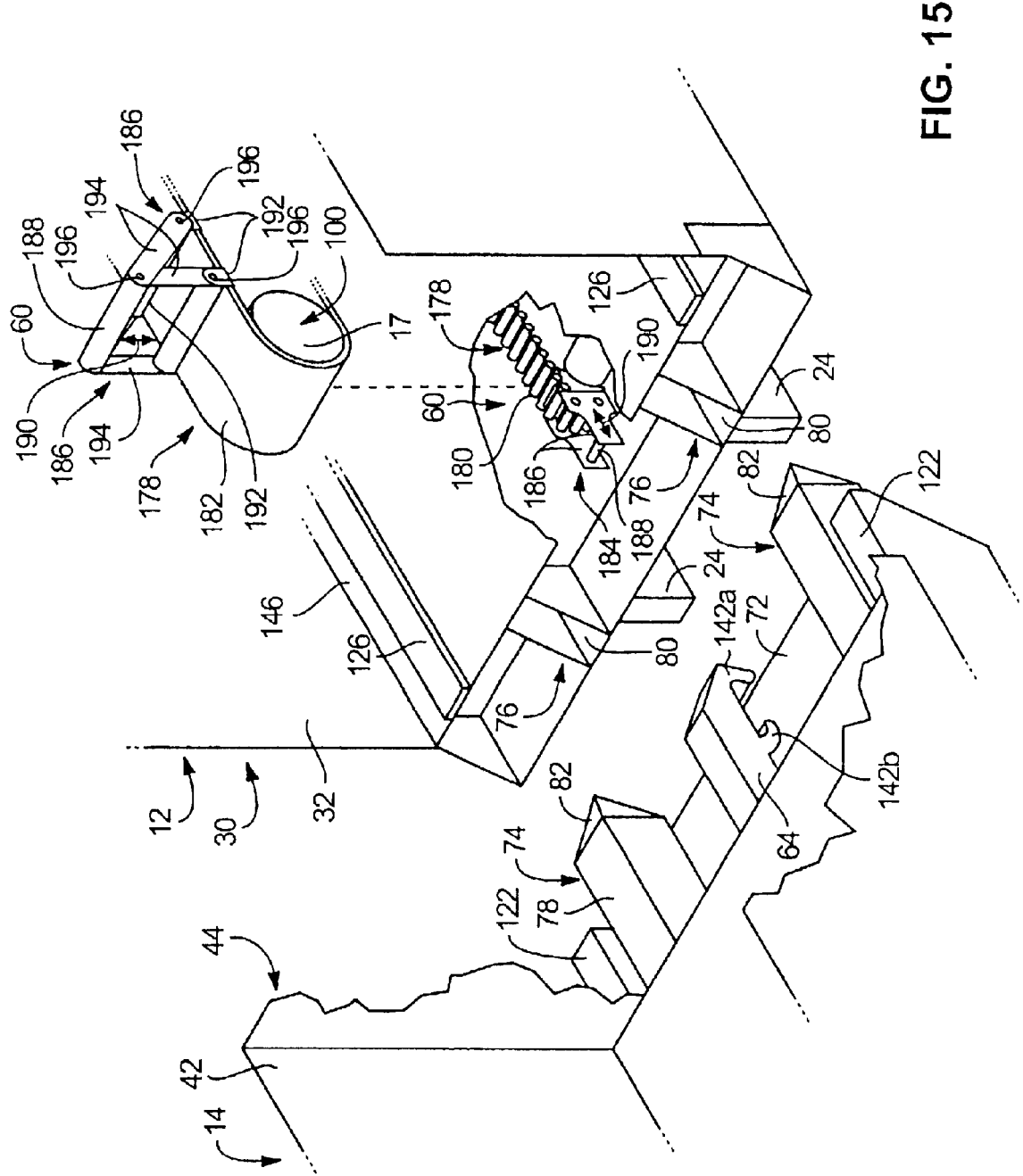
FIG. 15 is a cutaway perspective view of a transfer system having a track mounted on the truck in accordance with the invention.
Figure 16:
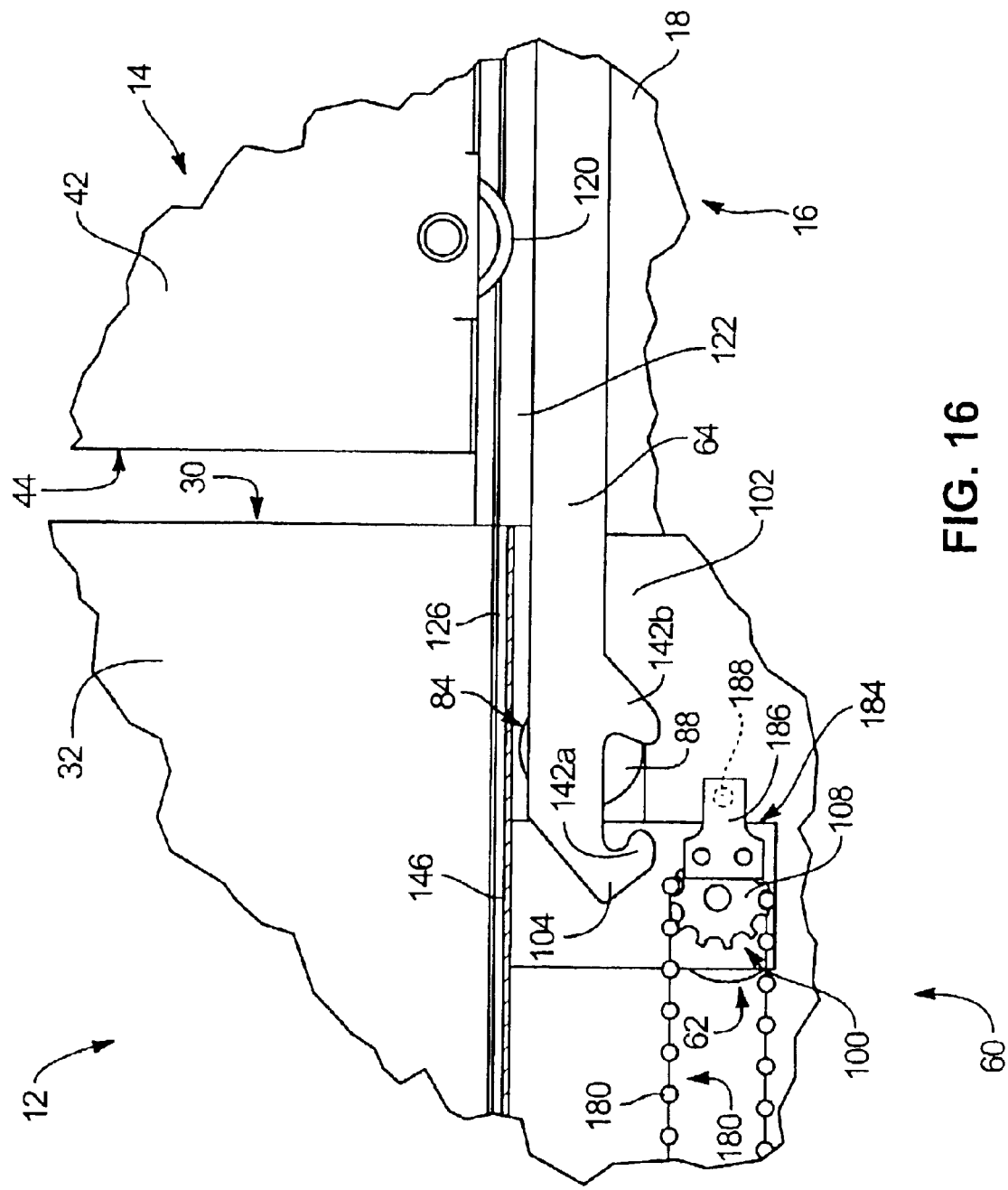
FIG. 16 is a partial side elevation view of the apparatus of FIG. 15 showing the disposition of the various components of the apparatus when the support and transfer module are initially engaged with the truck in accordance with the invention.
Figure 17:
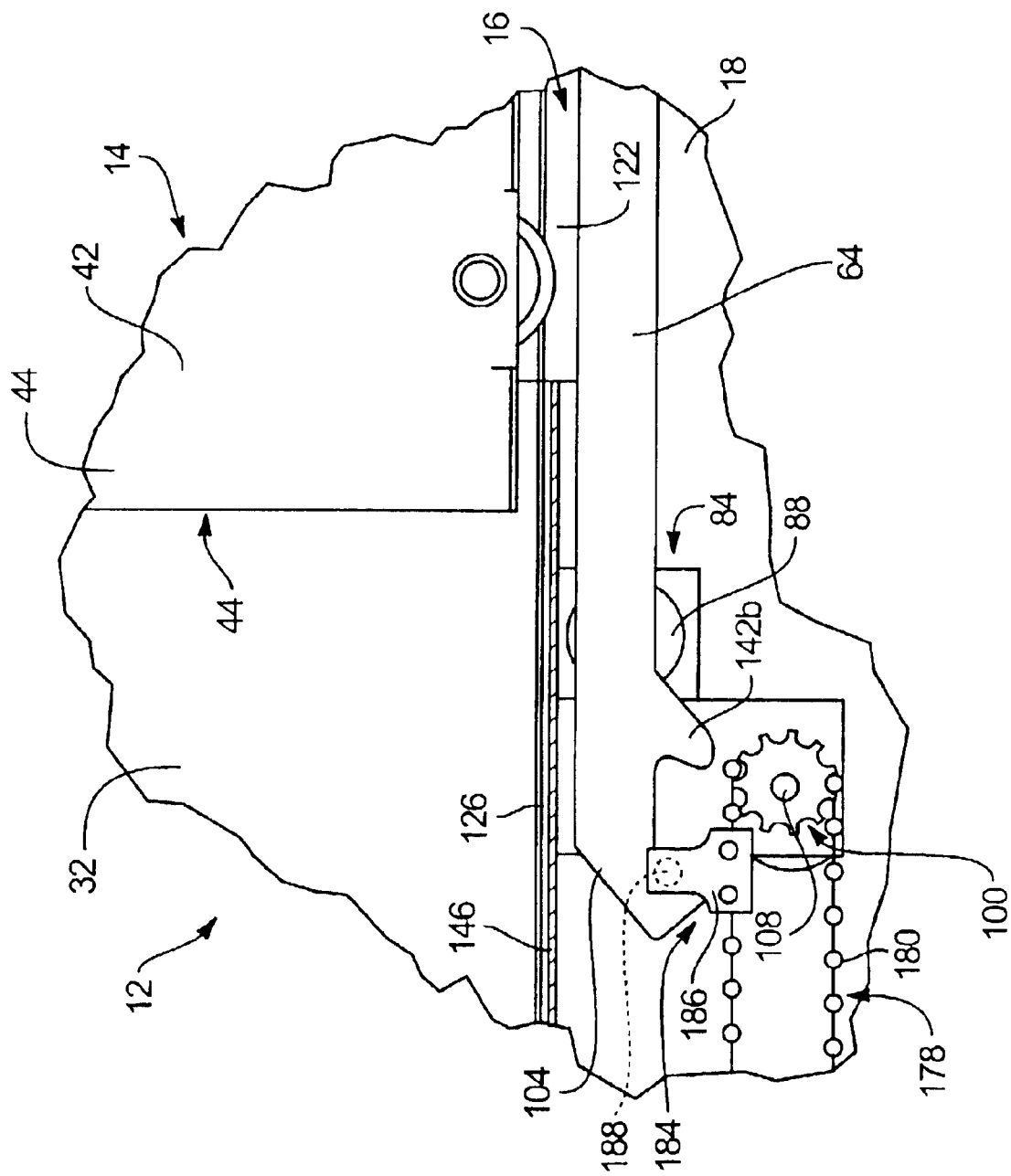
FIG. 17 is a partial side elevation view of the apparatus of FIG. 15 showing the disposition of the various components of the apparatus as the transfer module is being moved onto the truck.

Referring to FIGS. 15–17, a track 60 may be positioned on the truck 12 rather than on the transfer module 14. In certain embodiments of an apparatus 10, the track 60 may be embodied as a conveyor 178 extending from proximate the rearward end 46 toward the forward end 44 of the truck 12. The conveyor 178 may be driven by the hydraulic motor 98. The conveyor 178 may be a chain 180, belt 182, or the like. A conveyor 178 may have a dog link 184, or dog 184, having one or more protrusions or side pieces 186 on either one or both sides of the chain 180, a cross bar 188 may extend therebetween.

The cross bar 188 is typically secured to the side pieces 186 such that it is positioned a distance 190 away from the chain. Alternatively the side pieces 186 maybe replaced by a single hook 186, or post 186, protruding from the dog link 184 for engaging a hook 142, aperture 142, ring 142, or the like, formed on the pull bar 64.

Conveyors 178 embodied as belts 182 may have a dog 184 with side pieces 186 embodied as two links 194 having one end pivotably secured to the cross bar 188 and the other end secured to one of two bands attached to the belt 182 in order to allow the belt to wrap around a roller, such as a drive roller 170.

A dog 184 maybe positioned as shown in FIG. 16 at the time the truck 12 backs up to the transfer module 14. The driver 60 may be activated to move the dog 184 to the position shown in FIG. 17. As the dog 184 moves from the position of FIG. 16 to the position of FIG. 17 the cross bar 188 catches the hook 142a, or other protrusion, structure, or aperture. The driver 60 may then drive the dog 184 toward the forward end 44 of the truck 12 in order to load the transfer module 14 onto the truck 12. The driver may likewise be reversed to cause the cross bar 188 to catch the hook 142b, or other protrusion, structure, or aperture, and drive the transfer module 14 toward the rearward end 46 of the truck 12 in order to unload the transfer module 14.

Figure 18:
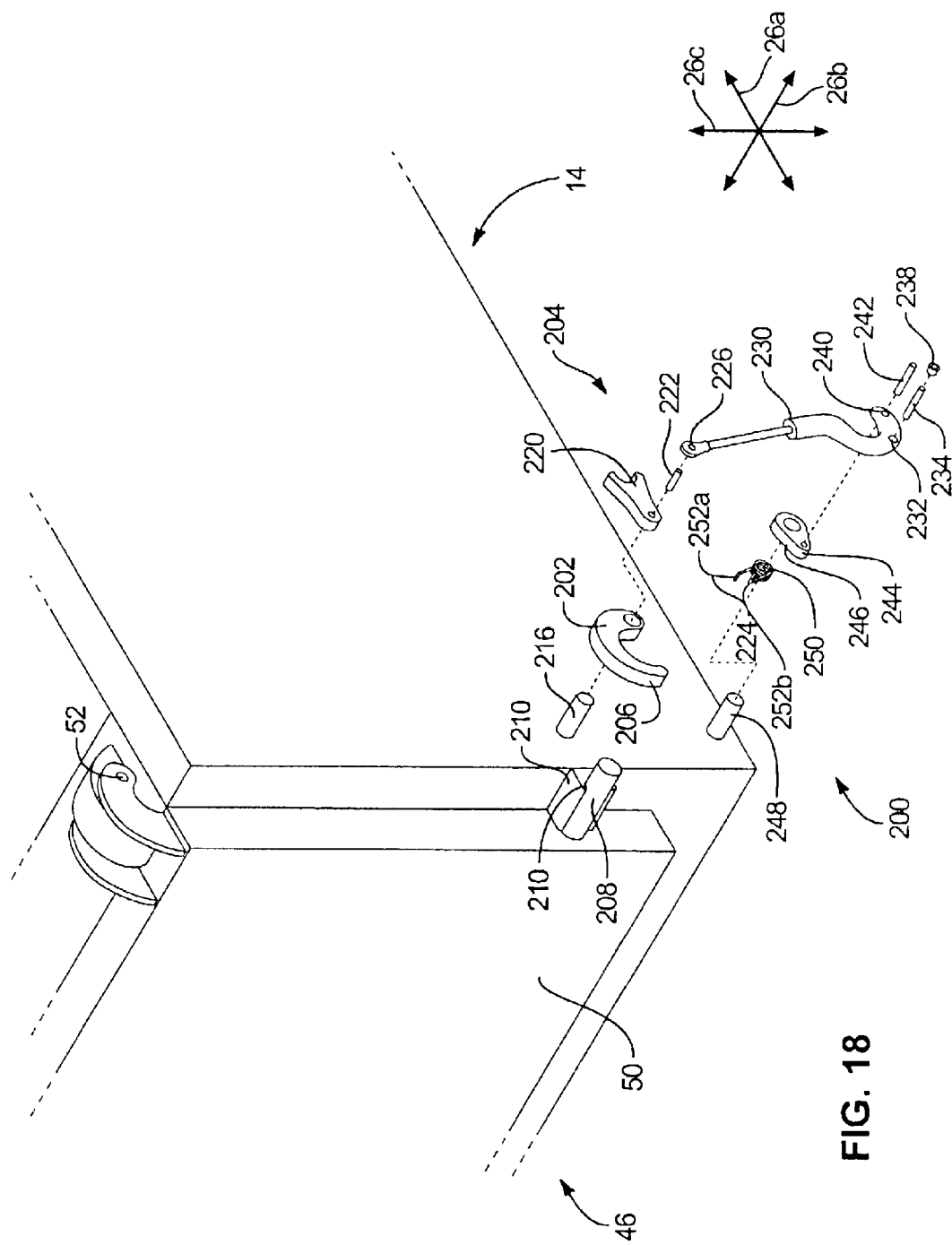
FIG. 18 is an exploded view of the components of a latching system and a locking system for a transfer module tailgate in accordance with the invention.

Referring to FIG. 18, a transfer module 14 having a tailgate 50 may have a latching system 200 secured to either side of the transfer module 14. The latching system 200 shown in FIG. 18 illustrates one side of the latching system 200, the other side of the latching system 200 may be substantially the mirror image of the side illustrated in FIG.

18. A latching system 200 may comprise a latch 202 for maintaining a tailgate 50 closed.

A locking system 204 maybe used to both actuate the latch 202 and to maintain the latch 202 in a position suitable for retaining the tailgate 50. A latch 202 may have an arm 206 for retaining a structure on the tailgate 50 in order to hold the tailgate 50 closed. In certain embodiments the arm may retain a rod 208, post 208, or other structure 208, extending from the tailgate 50.

A catch 210 may secure to the transfer module 14. The catch 210 may serve to register the rod 208 with respect to the transfer module 14. In certain embodiments the catch 210 maybe or include a notch 212 formed to receive the rod 208, post 208, or other structure 208.

The latch 204 may be either fixedly or pivotably secured to a pivot 216 or shaft 216. The shaft 216 may be pivotably or fixedly secured to the transfer module 14. For embodiments having a latch 204 fixedly secured to the shaft 216, the shaft 216 is typically pivotably secured to the transfer module 14. For embodiments having a latch 204 pivotably secured to the shaft 216 the shaft 216 may be either pivotably or fixedly secured to the transfer module 214.

A crank 220 may be either fixedly or pivotably secured to the pivot 216. For embodiments having a crank 220 and latch 204 pivotably secured to the pivot 216, the crank 220 may also secure to the latch 204 such that relative rotation therebetween is substantially prevented. A pin 222 may pivotably secure the free end 224 of the crank 220 to the end 226 of a hook 230.

A roller 238 maybe rotatably secured to the hook 230 by a pin 234. The end 240 of the hook 230 maybe secured with a pin 242 to the free end 244 of a toggle link 246. The toggle link 246 may be fixedly secured to a pivot 248, or shaft 248, pivotably secured to the transfer module 14. Alternatively, the toggle link 246 may be pivotably secured to the shaft 248 and the shaft 248 may then be either pivotably or fixedly secured to the transfer module 14.

A spring 250 may serve to predictably position the roller 238 for engagement in order to change the state of the locking system 204. The spring 250 typically urges the hook 230 into a position to engage a driving surface, or the like, which may serve to force the hook locking system 204 into a variety of positions. The spring 250 may bias the hook 230 in a variety of directions in order to accomplish its purpose.

For example, a spring 250, such as a torsion spring 250 or the like, may have one end 252a engaging the hook 230 and the other end 252b engaging the transfer module 14 to urge the end 240 of the hook 230 downward substantially in the transverse direction 26c. Alternatively, the spring 250 may have one end 252a engaging the toggle link 246 and the other end 252b engaging the transfer module 14 biasing the toggle link 246 to rotate about the pivot 248, effectively urging the end 240 of the hook 230 downward substantially in the transverse direction 26c. The spring 250 may also have one end 252a engaging the hook 230 and the other end 252b engaging the toggle link 246 with the spring loaded to cause the hook 230 to rotate relative to the toggle link 246, effectively urging the hook 230 downward substantially in the transverse direction 26c.

Figure 19:
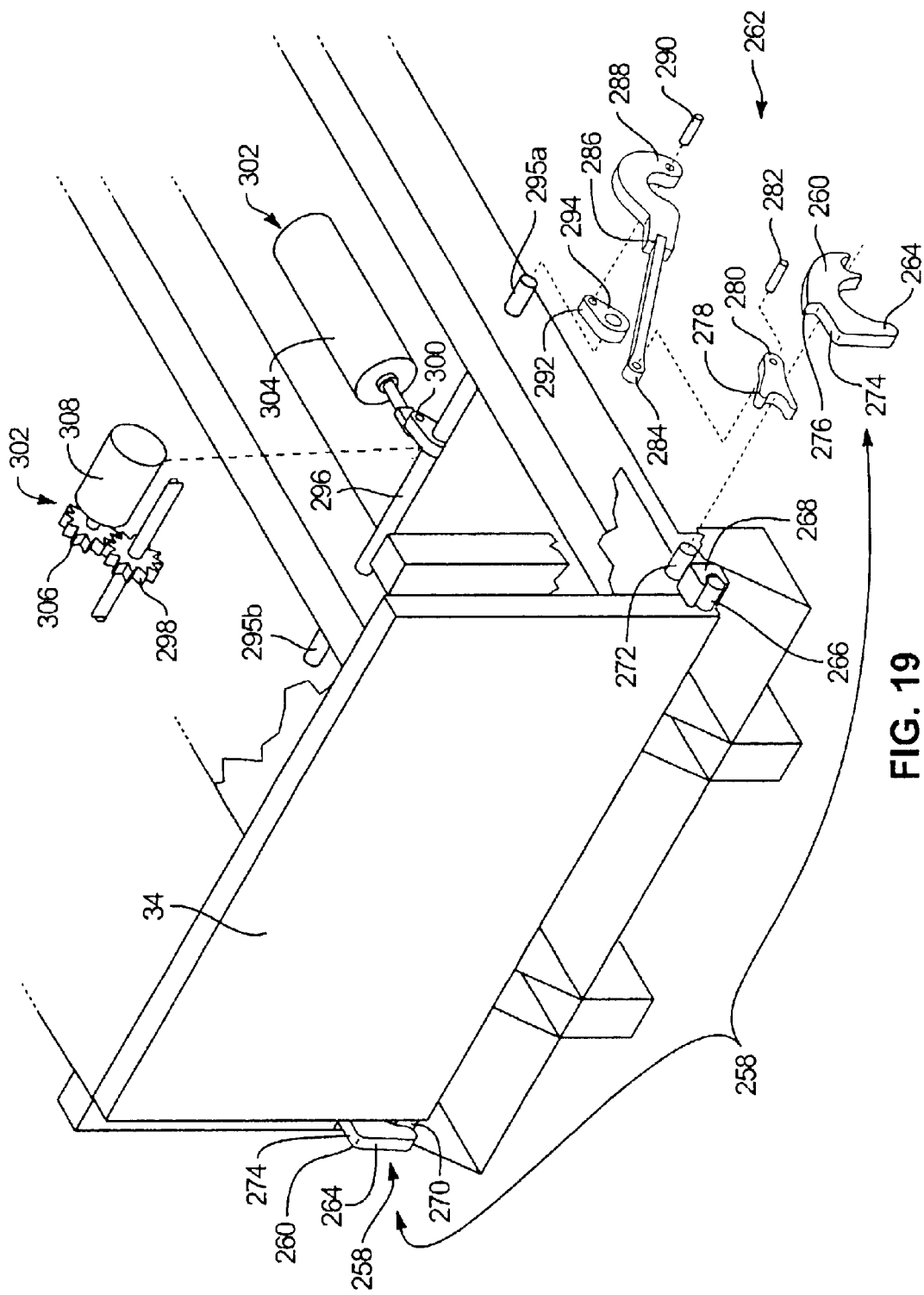
FIG. 19 is an exploded view of the components of a latching system and a locking system for a truck-mounted dumping body tailgate in accordance with the invention.

Referring to FIG. 19, A truck 12 having a body 22 with a tailgate 34 may have a latching system 258 having latches 260 located on either side of the truck 12 and locking systems 262 on either side 263 of the truck 12. A locking system may provide for locking of the position of a latch 260 relative to the truck 12. The locking system 262 may also provide for the actuation of the latch 260. A latch 260 may have an arm 264 for engaging a rod 266, post 266, or other structure 266 extending from the sides of the tailgate 34.

Catches 268 may be formed on the truck 12 for receiving the rods 266. The rods 266, or posts 266, may be held between the arms 256 and the catches 268 when the tailgate 34 is being held closed. In certain embodiments a catch 368 may have a notch 270 for retaining a rod 266, or post 266. The latch 260 may be either fixedly or pivotably attached to a pivot 272. The pivot 272 may be either fixedly or pivotably secured to the truck 12. For embodiments of an apparatus 10 having a latch 260 fixedly secured to the pivot 272, the pivot 272 is typically pivotably secured to the truck 12.

A latch 260 may have a driving surface 274 on the latch 260 to engage the roller 238 secured to the hook 230. A stop 276 may also be either formed with or secured to the latch 260 near the driving surface. The stop 276 may then catch the roller 238 as the transfer module 14 is inserted into the truck 12 and also serve to drive the locking system 204 into a locked position.

A crank 278 maybe either fixedly or pivotably secured with respect to the pivot 272. For embodiments of the apparatus 10 having a latch 260 that is pivotably secured to the pivot 272, the crank 278 maybe secured to the latch 260 such that relative rotation of the crank 278 with respect to the latch 260 is substantially prevented. For embodiments wherein the latch is fixedly attached to a pivot 272 pivotably secured to the truck 12, the crank 278 is typically fixedly secured to the pivot 272.

A crank 278 may have a free end 280 pivotably secured, by a pin 282, or some other fastener 282, to the end 284 of a hook 286. An end 288 of the hook maybe pivotably secured with a pin 290, or other fastener 290, to the free end 292 of a toggle link 294. The toggle link 294 may be fixedly secured to a shaft 296 extending across the truck 12 substantially in a lateral direction 26b. The shaft 296 may be rotatably secured to the frame 24 of the truck 12. A crank 298 maybe fixedly secured to the shaft 296. The free end 300 of the crank 298 may engage an actuator 302, such as a hydraulic piston 304, or the like. Alternatively, the crank 298 maybe embodied as a gear 298 which may engage a gear 306 driven by a motor 308.

Referring to FIGS. 20A and 20B, a locking system 204, 262 may make use of the toggle position of the various components of the system 204, 262 in order to provide a self locking system 204, 202. For example a toggle link 246, 294, may be forced to rotate from the position shown in FIG. 20A to the position shown in FIG. 20B. The rotation of the toggle link 246, 294 may require rotation through an angular region 324 where the distance between the end 240, 288 and the end 226, 284 of the hook 230, 286 must exceed the undeformed length of the hook 230, 286 in order for the end 226, 284 to be moved therethrough. Thus, it requires that a force sufficient to deform a hook 230, 286 be exerted on the toggle link 246, 294 in order to move the hook 230, 286 into and out of the position of 19B. The end 226, 284 may need to be restrained from moving in order for the rotation of the toggle line 246, 294 to cause deformation of the hook 230, 286. A catch 210, 268 may interfere with the arm 206, 264 in order to constrain rotation of the latch 202, 260, effectively restraining the end 226, 284 of a hook 230, 286.

The curvature 326 of the hook may facilitate locking by preventing further rotation in a direction 328 of a toggle link 246, 294 once the hook 230, 286 has been moved through the angular region 324. The curvature 326 allows the end 240, 288 to be moved through the angular region 324 without interference with the pivot 248 or shaft 296.

However, once the toggle link 246 has moved through the angular region 324, the hook 230, 286 will interfere with the pivot 248, or shaft 296, to prevent further substantial rotation in a direction 328.

Typically a hook 230, 286 and toggle link 246, 294 will be loaded substantially in a direction 328. It can readily be seen that such loading cannot result in a rotational force sufficient to move a toggle link 246, 294 out of the position of FIG. 19B into the position of FIG. 19A. Thus, the toggle link 246, 294 and hook 230, 286 are effectively locked in position and require no constant exertion of force to be maintained locked. The toggle link 246, 294 and hook 230, 286 can therefore be used to move a structure, such as a latch 202, 260, through an angle 330 and lock it in place.

Figure 21:
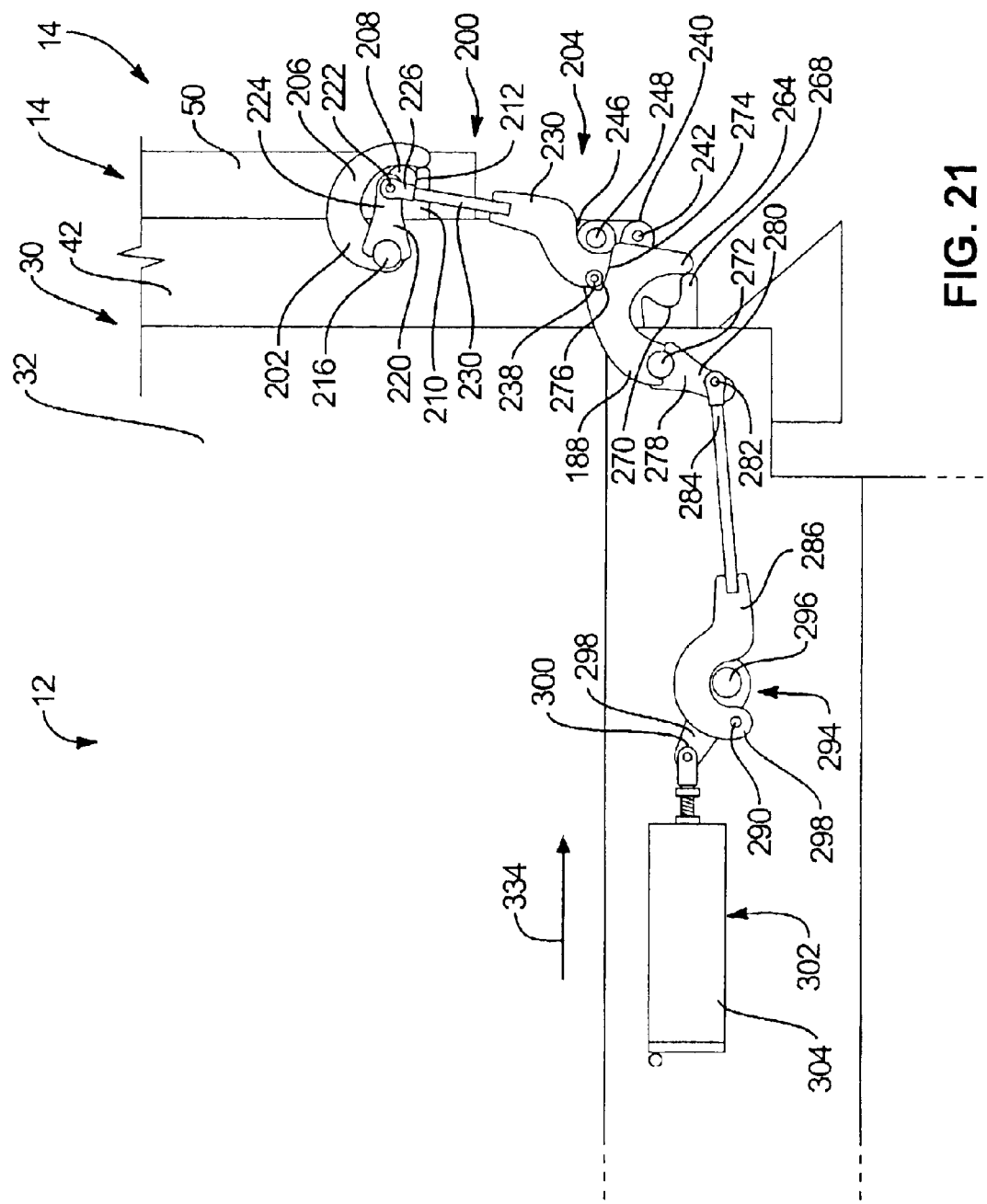
FIG. 21 is a side elevation of latching and locking systems for use with transfer module and truck-mounted dumping body tailgates, with the transfer module tailgate locked in a closed position in accordance with the invention.
Figure 22:
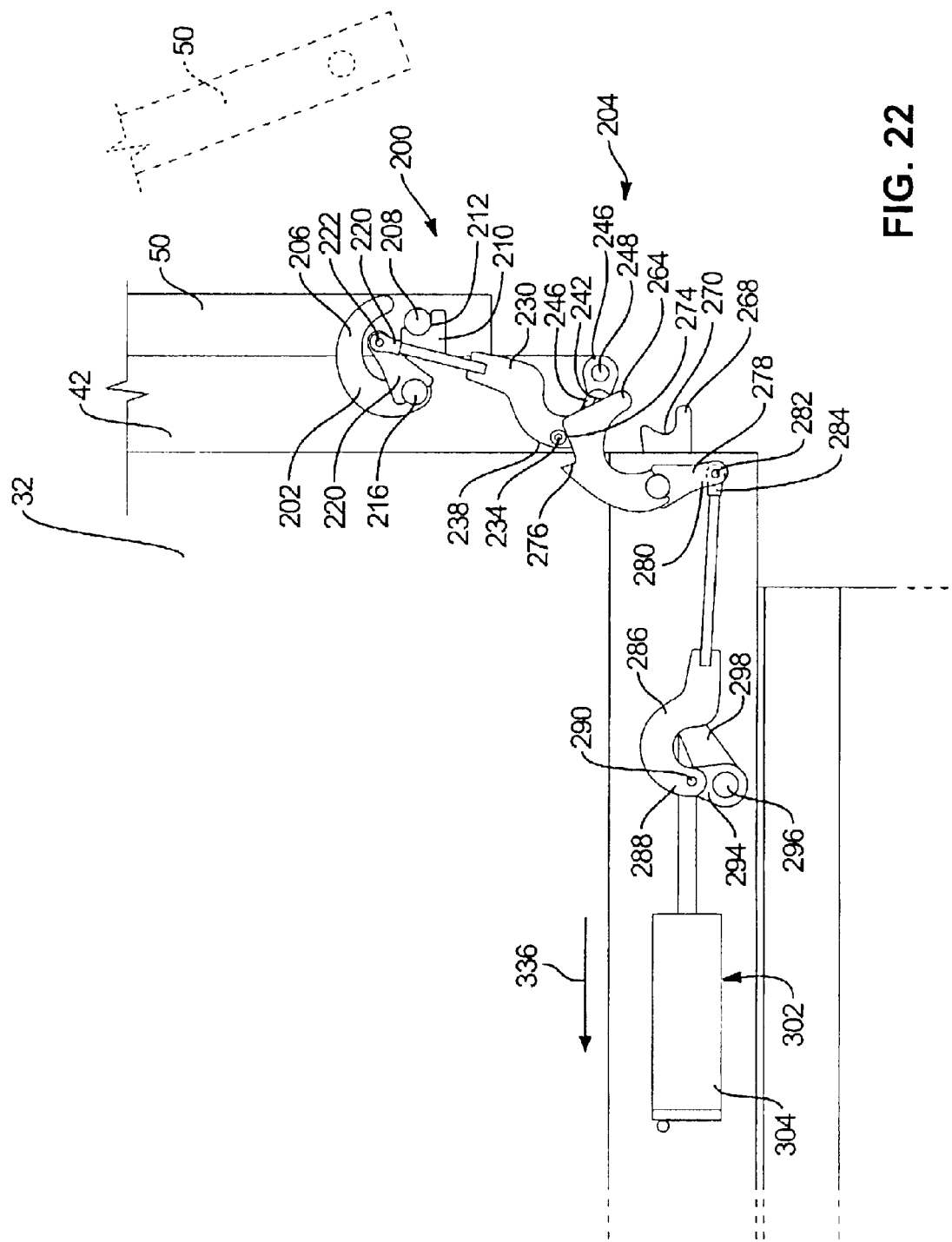
FIG. 22 is a side elevation of latching and locking systems for use with a transfer module and truck-mounted dumping body tailgates, with the latching systems in unlocked positions in accordance with the invention.

Referring to FIGS. 21 and 22, upon transfer of a transfer module 14 into a truck 12 the roller 238 may be positioned adjacent the driving surface 274. The hook 230 and toggle link 246 may be in a locked position, maintaining the arm 206 of the latch pressed against the catch 210, maintaining the tailgate 50 closed as shown in FIG. 21. The hook 286 and toggle link 294 may likewise be in a locked position.

The actuator 302 may exert a force on the crank 298 in a direction 334, thereby causing the shaft 296 to rotate the toggle link 294 and hook 286 out of the locked position of FIG. 21. The hook 286 may then exert a force on the crank 278, causing the driving surface 274 to push against the roller 238. The force exerted on the roller 238 may then force the hook 230 and toggle link 246 out of the locked position of FIG. 21. The force exerted on the hook 230 may be transferred through the hook 230 to the crank 220, opening the latch 202 and releasing the rod 208, or post 208, effectively allowing the tailgate 50 to open as shown in FIG. 22.

The actuator 302 may exert a force on the crank 298 in a direction 336, thereby causing the shaft 296 to rotate the toggle link 294 and hook 286 into the locked position of FIG. 21. The hook 286 may then exert a force on the crank 278, causing the stop 276 to push against the roller 238. The force exerted on the roller 238 may then force the hook 230 and toggle link 246 into the locked position of FIG. 21. The force exerted on the hook 230 may be transferred through the hook 230 to the crank 220, closing the latch 202 and engaging the rod 208, or post 208, effectively closing the tailgate 50 as shown in FIG. 21.

The actuator 302 may also serve to latch and unlatch the tailgate 34 of the body 32. The actuator 302 may cause the hook 286 and toggle link 294 to move to the locked position of FIG. 21 thereby locking a rod 208. In the absence of a transfer module 14 loaded onto the truck 12, the latch may then move to secure the rod 266, or post 266, secured to the tailgate 34 between the arm 264 of the latch 260 and the catch 270. In a like manner the actuator 302 may move the hook 286 and toggle link 294 to the open position of FIG. 2B and release the rod 266, or post 266, from the arm 264 of the latch 260. In this manner the same actuator 302 may latch and unlatch both of the tailgates 34, 50.

Figure 23A:
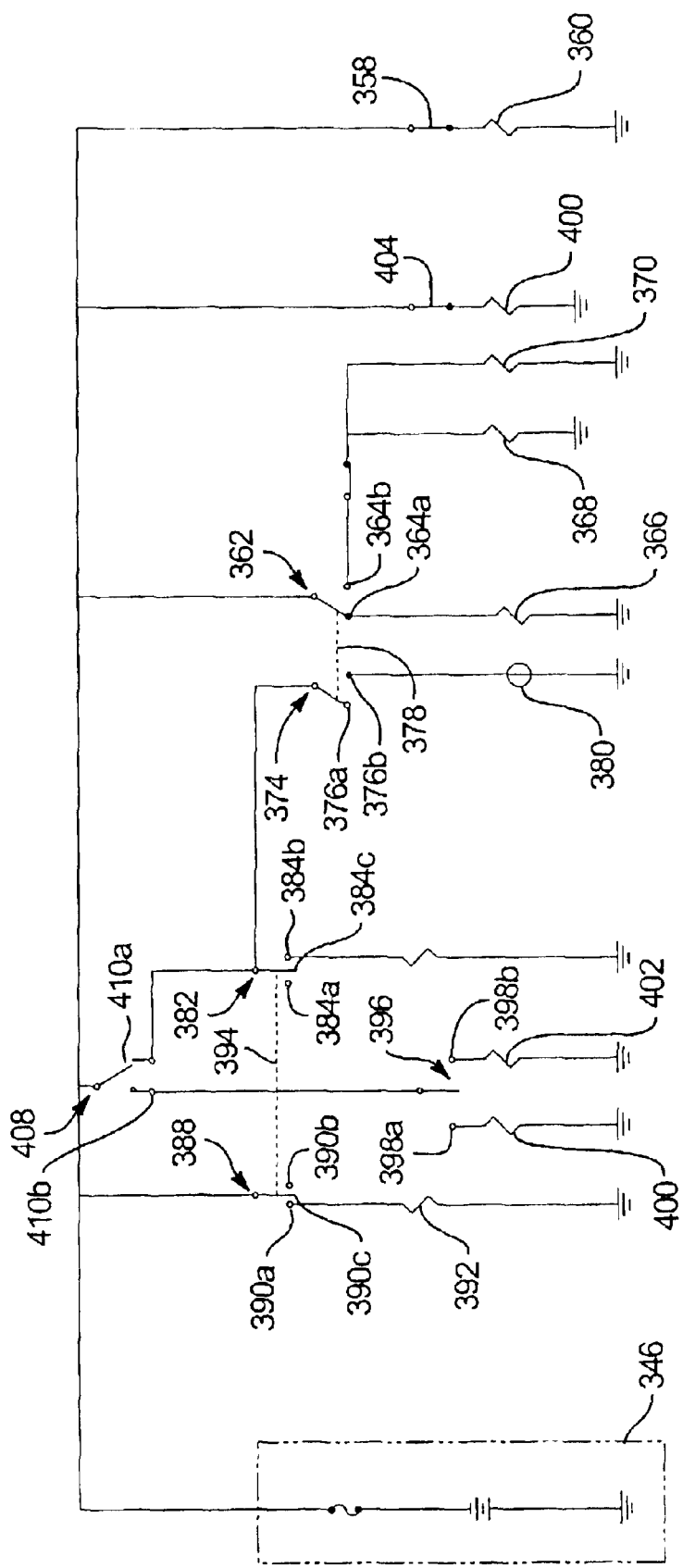
FIG. 23A is a schematic representation of an electrical system for use in accordance with the invention
Figure 23B:
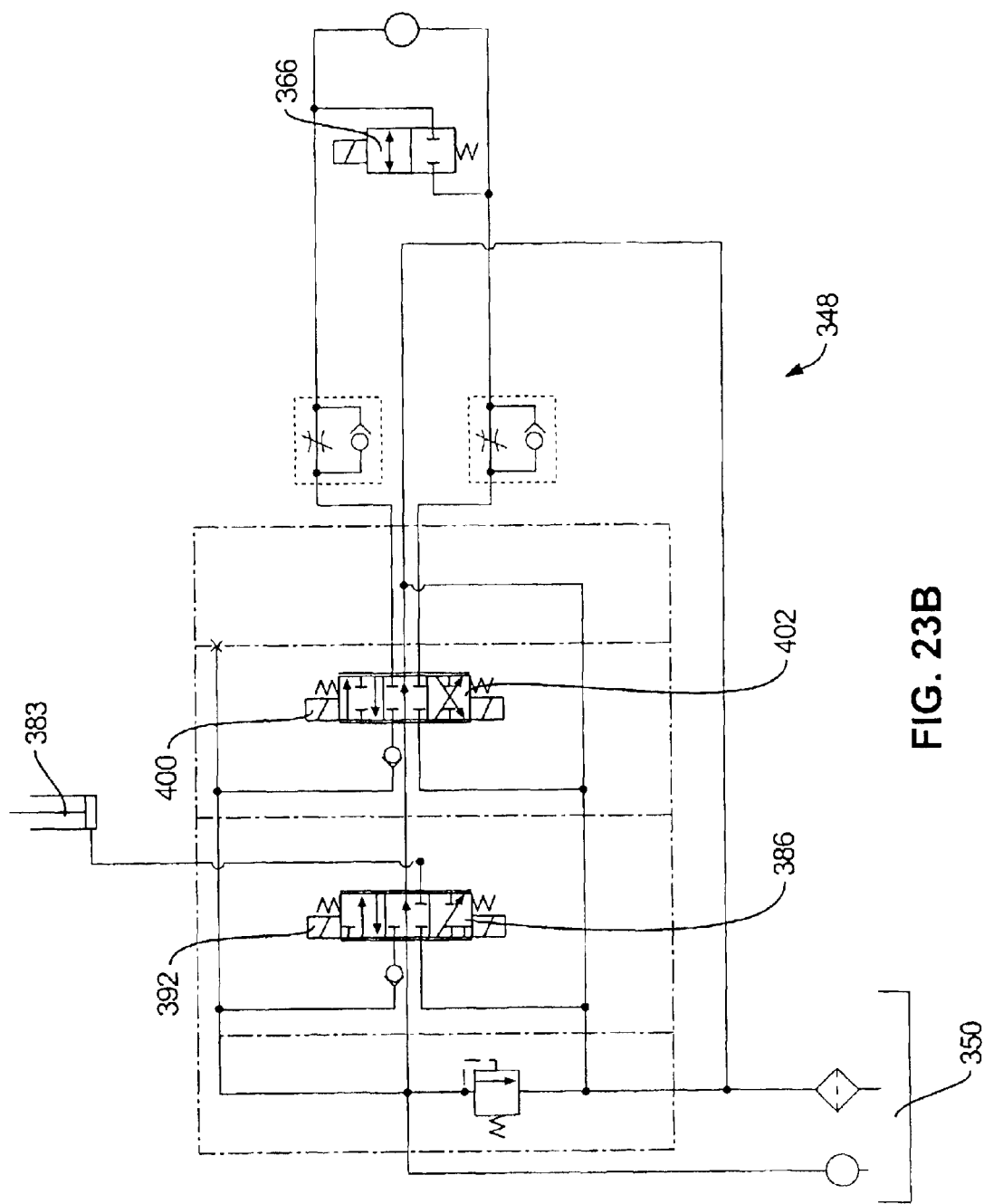
FIG. 23B is a schematic representation of a hydraulic system suitable for use in accordance with the invention.
Figure 23C:
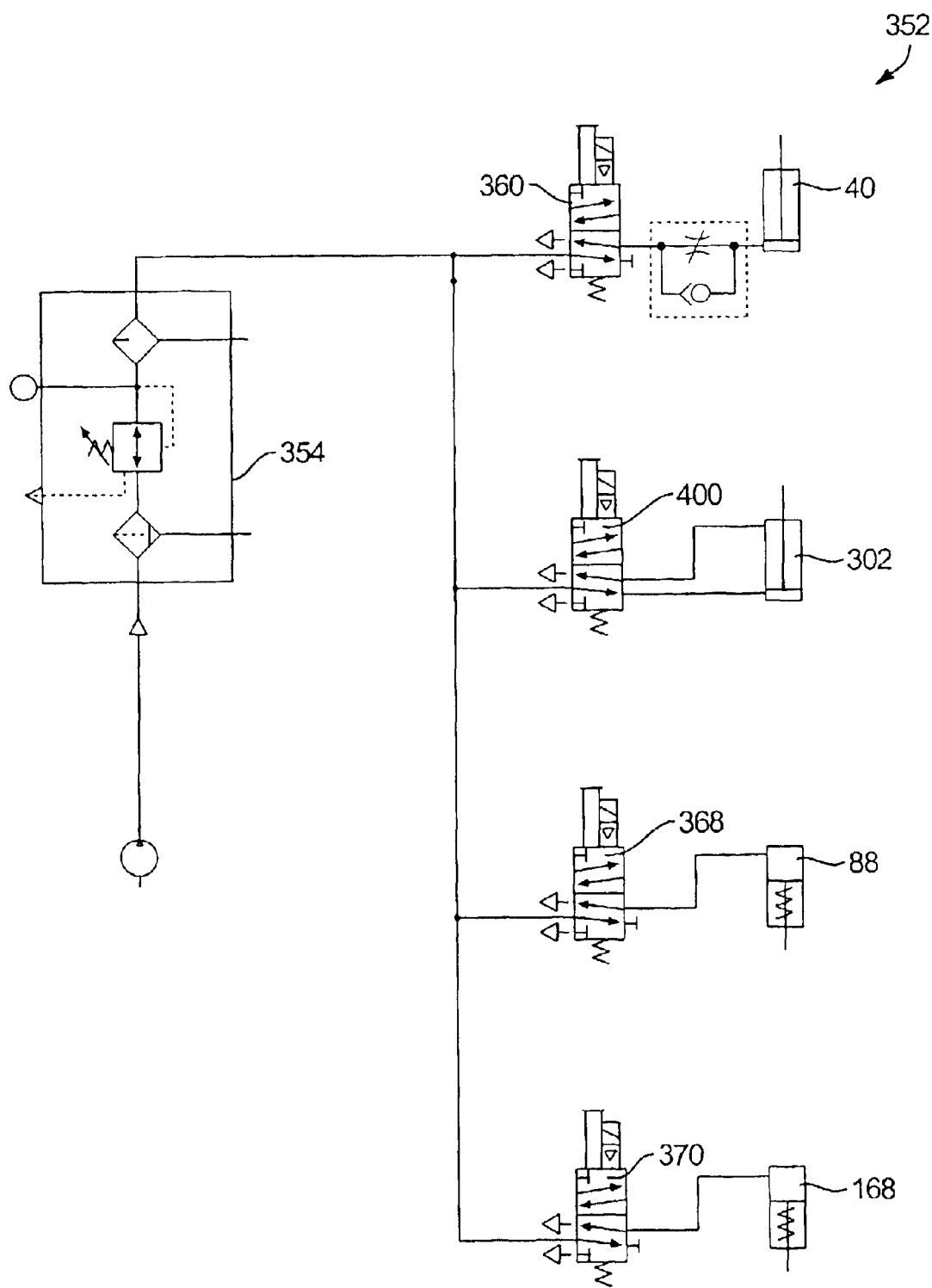
FIG. 23C is a schematic representation of a pneumatic system for use in accordance with the invention.
Figure 24:
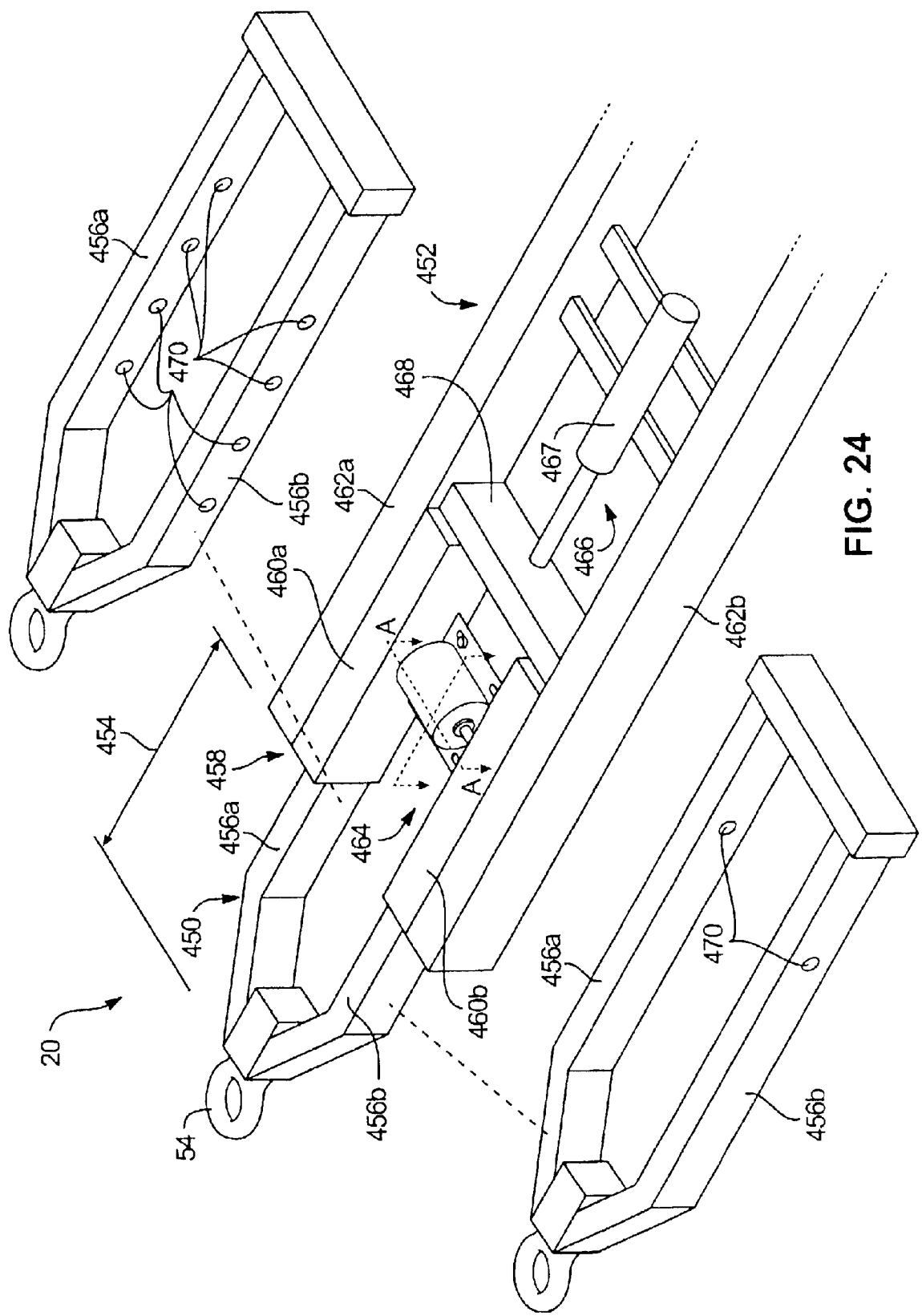
FIG. 24 is a partial perspective view of an extensible draw bar in accordance with the invention.

Referring to FIGS. 23A–23C, the pneumatic and hydraulic components of the apparatus 10 may be controlled by an electrical system 348 shown schematically in FIG. 23A. The electrical system 348 may be powered by a power source 346, such as a battery 346. The hydraulic components of the apparatus 10 may form part of a hydraulic system 348 shown in FIG. 23B. The hydraulic system 348 may be powered by a pressure source 350, such as a hydraulic pump 350 associated with the truck 12. The pneumatic components of the apparatus 10 may form part of a pneumatic system 352 shown in FIG. 23C. The pneumatic system 352 may be powered by a pressure source 354, such as a compressor 354 on the truck 12.

A switch 358 may be closed to apply a voltage to a tailgate valve 60, opening the valve 60 and enabling hydraulic fluid to enter the cylinder 40, the cylinder thereby raises the tailgate 34 of the dumping body 32. A transfer mode switch 362 maybe moved to a position 364a in order to apply a voltage to the free wheel valve 366. By opening the valve and thereby directing the flow of hydraulic fluid to bypass the motor 98 allowing the motor to be spun freely by the track 60 forced over the drive wheel 100. The transfer mode switch 362 maybe moved to a position 364b to apply a voltage to a lock pin valve 368. Opening the valve 368 and enabling pressure to be applied to the cylinder 88 causes the lock pin 86 to press against some structure of the transfer module 14 or to force itself into a locking aperture 90.

The positioning of the transfer mode switch 362 to the position 364b may also cause a voltage to be applied to retainer valve 370. Opening a valve 370 and enables pressurized gas to cause the piston 168 to force the retainer 164 against a pull bar 64 to enhance friction between a drive wheel 100 and the track 60. An override switch 372 may be used to cut off voltage from both the free wheel valve 366 and the retainer 164. This may enable a user to disengage the locking pin 86 from the transfer module 14 when the transfer module 14 is being transferred out of the truck 12.

The engage mode switch 374 may have positions 376a, 376b. The engage mode switch 374 may be placed in position 376b to permit the application of voltage to a light in the cab of a truck 12, thereby alerting the operator that a transfer module 14 is safely locked onto the truck 12. The transfer mode switch 362 and engage mode switch 374 maybe coupled by a linkage 378 such that whenever the switch 362 is in the position 364a the switch 374 is in position the 364a. Whenever the switch 362 is in the position 364b the switch 374 is in position 364b. Thus, the light 380 will not turn on unless the lock pin valve 368 is open.

A dump switch 382 may control the flow of hydraulic fluid to the hoist 383. The dump switch 382 may have two positions 384a, 384b. The switch 382 may be located in position 384a in order to apply a voltage to the dumping valve 386. Opening the valve 386 pressurizes the hoist 383 to dump the load of the dumping body 32.

The undump switch 388 may have two positions 388a, 388b. The switch 388 maybe positioned in a position 390a in order to apply a voltage to the undumping valve 392. Opening the valve 392 enables the hoist 382 to de-pressurize, allowing the dumping body 32 to rest on the frame 24 of the truck 12. The switches 382, 388 may also have positions 384c, 390c resulting in an open circuit between the power source 346 and the valves 386, 392. The dump switch 382 and undump switch 388 may be coupled by a linkage 394 such that the switch 382 is in one of the positions 384a–384c whenever the switch 388 is in one of the positions 390a–390c, respectively.

A transfer switch 396 may have positions 398a–398c. The switch 396 maybe located in a position 398a in order to apply a voltage to a transfer in valve 400. Opening the valve 400 pressurizes the hydraulic motor 98 in a direction causing the transfer module to be transferred onto the truck 12. The switch 396 may be located in the position 398b in order to apply a voltage to a transfer out valve 402. Opening the valve 402 pressurizes the motor 98 such that the transfer module 14 is transferred off the truck 12.

A tailgate lock switch 404 maybe closed to apply a voltage to the tailgate lock valve 406, opening the valve 406 and causing the actuator 302 to open the tailgate latches 202 and 260. In certain embodiments, the actuator 302 may have a bias such that when the valve 406 is open, the actuator 302 moves the latches 202, 260 into locked positions as in FIG. 21.

A lock sensor 408 may follow the position of the lock 84 and restrict the operation of the other components of the hydraulic system 348 and pneumatic system 352. For example the lock sensor 408 may be in a position 410a when the lock pin 86 is engaged with the aperture 90. Placing the sensor 408 in a position 410a enables the light 380 to turn on indicating that the transfer module 14 is safely locked onto the truck 12. The placement of the sensor 408 in position 410a may also enable a voltage to be applied to the dump valve 386 in order to open it and dump a load from the truck 12.

The sensor 408 may be placed in a position 410b indicating that the lock pin 86 has not fully engaged the aperture 90. Placing the sensor in position 410b may prevent the application of voltage to the light 380 and dumping valve 386, preventing the dumping of a transfer dumping body 42 not properly locked onto the truck 12.

Referring to FIG. 23, a draw bar 20 may have an extension 450 slidably secured to a static portion 452. The extension 450 may be adjustable with respect to the static portion 252 in order to vary the distance 454 between the pintle ring 54 and the static portion 452. The adjustability of the distance 454 may provide for easier securement of a trailer 18 to a truck 12. The adjustability may provide for the truck 12 to be positioned with the pintle hitch 56 located within a large region rather than at a specific point and still allow for the pintle ring 54 to be placed on the pintle hitch 56. The extension 450 may have arms 456a, 456b, or a single arm 456, which may slide along a guide 458 secured to the static portion 452.

The guide 458 maybe embodied as sleeves 460a, 460b, or a single sleeve 460 secured to arms 462a, 462b of the static portion 452. The arms 456a, 456b, or arm 456, may slide within the sleeves 460a, 460b, or sleeve 460, in order to provide adjustability of the distance 454. A lock 464 may fix the position of the extension 450 with respect to the static portion 452. An extender 466 may move the extension 450 with respect to the static portion 452.

In certain embodiments the extender 466 may be a pneumatic piston 467, hydraulic piston 467, electric actuator 467, or the like. The pneumatic piston 467 may exert a force on a cross beam 468 secured to both of the arms 456a, 456b. In certain embodiments an operator may control the flow of air to the piston 467 in order to control extension of the extension 450. In some embodiments an operator will open a valve or the like in order to allow pressurized gas, or the like, to contact the piston 467. The cross beam 468 may serve to provide stiffness to the extension 450 and ensure that the arms 456a, 456b move simultaneously. The arms 456a, 456b may have apertures 470 formed therein to receive locking pins or the like to fix the position of the extension 450 with respect to the static portion 452. In certain embodiments there may be a plurality of apertures 470 formed along an arm 456a and along an arm 456b. This may enable the pintle ring 454 to be fixed at a variety of lengths 454 from the static portion 452.

In operation, an operator may disengage the lock 464 such that the extension 450 is free to move with respect to the static portion 452. The operator may extend the extension 450 to the pintle hitch 56 and secure the pintle ring 54 thereto. The operator may then activate the lock 164. The lock 164 may then automatically engage, fixing the position of the extension 450 with respect to the static portion 452 as the operator backs the truck 12 toward the trailer 18.

Figure 25B:
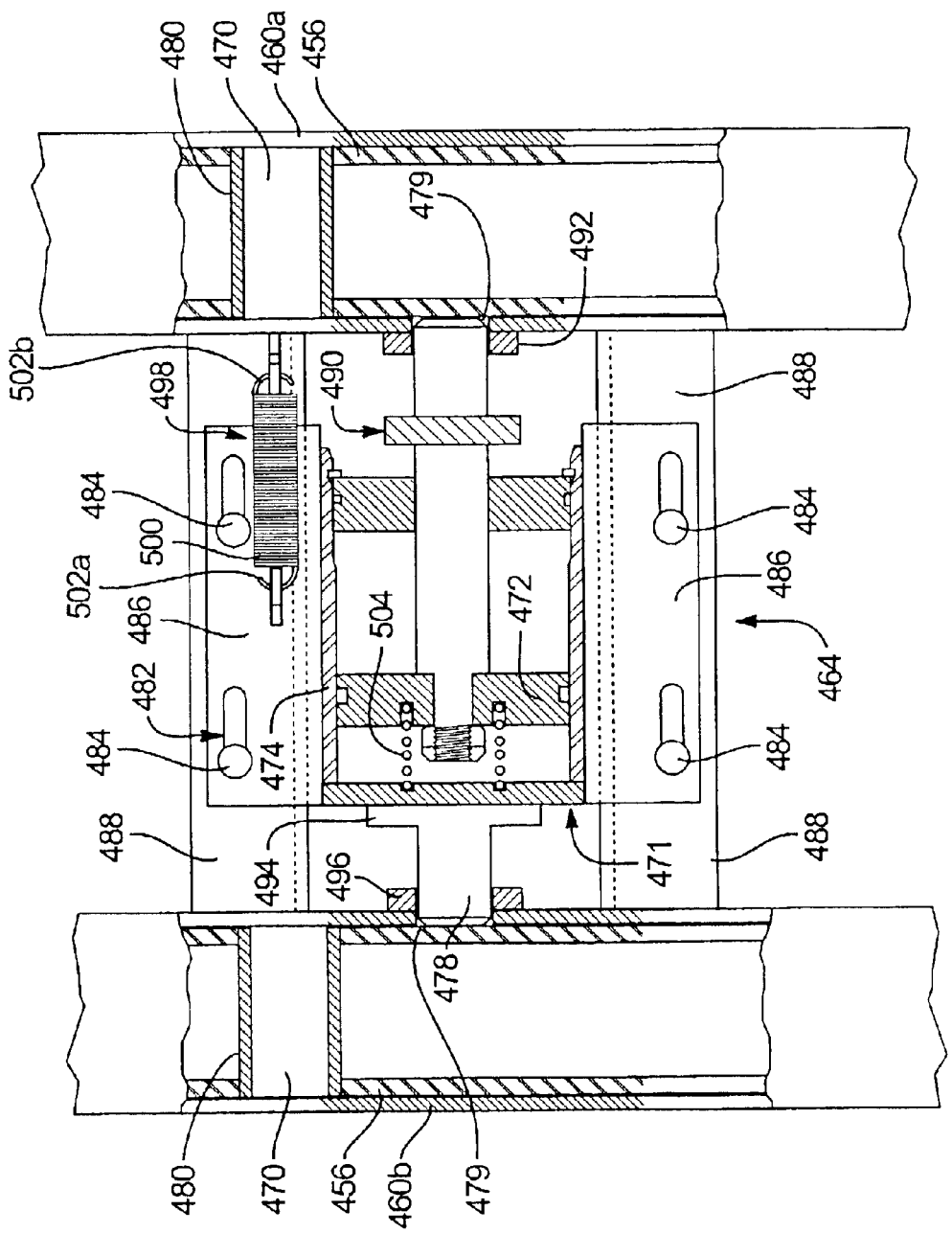

Referring to FIGS. 25A–25C, a lock 464 may have an actuator 471 for engaging and disengaging the lock 464. In certain embodiments the actuator 471 may move the lock 464 from the state shown in FIG. 25A to the state shown in FIG. 25C. In certain embodiments the actuator 471 may be embodied as a pneumatic piston 472 and cylinder 474. Alternatively, the actuator 471 maybe embodied as a hydraulic piston 472 and cylinder 474, electric actuator 474, or the like. In certain embodiments the lock 464 may be secured to the guides 458. In other embodiments the lock 464 maybe secured to the arms 456a, 456b, or arm 456. A pin 476 may be secured to the piston 472 and a pin 478 secured to the cylinder 474.

The cylinder 474 maybe pressurized and force the piston 472 to move outwardly from the cylinder 474. In certain embodiments an operator may pressurize the cylinder 474 by opening a valve, or the like, to allow pressurized gas to enter the cylinder 474. The motion of the piston 472 may drive the pin 476 into an aperture 479 formed in the sleeve 460a and the aperture 470 formed in the arm 456a. The pin 478 may move into an aperture 479 formed in the sleeve 460b and the aperture 470 formed in the arm 456b, as shown in FIG. 25B. When the apertures 470 are not aligned with the pins 476, 478, as shown in FIG. 25C, the pins 476, 478 may press against the arms 456a, 456b until the arms 456a, 456b are moved into position such that the apertures 470 are aligned with the pins 456a, 456b, at that point, the pins 476, 478 will be forced into the apertures 470. This may allow for the extension 450 to be drawn out in order to facilitate coupling with a trailer 18.

The cylinder 474 may then be pressurized and the truck 12 backed toward the trailer 18 such that the arms 456a, 456b are pushed along the sleeves 460a, 460b until the pins 476, 478 are aligned with the apertures 470. The pins 476, 478 may then insert into the apertures 470 effectively fixing the position of the extension 450 relative to the static portion 452 such that the truck 12 can now tow the trailer 18.

In certain embodiments the arms 456a, 456b, or arm 456a, maybe formed as rectangular tubes. The locking pins 476, 478 may be responsible for transferring loads from the extension 450 to the static portion 452. The pins 476, 478 may, therefore, exert very large forces on the arms 456a, 456b, or arm 456a. Accordingly, a bushing 480 maybe inserted into an aperture 470 and extend across the vacant area of the tube to help distribute loads from a locking pin 476, 478 across both sides of the tube.

The actuator 471 may be slidably mounted with a guide 482. The guide 482 may be embodied as slots 484 receiving pins 485. The slots 484 may be formed in flanges 486 secured to the actuator 471. Alternatively, the guide 482 maybe embodied as rails 487 extending between the sleeves 460a, 460b. The actuator 471 maybe secured to the rails and slide substantially freely therealong.

Alternatively, the guide 482 may be embodied as a channel 487 extending between the sleeves 460a, 460b with the actuator 471 sliding therealong. The pins 484 may be fixed to supports 488 extending between the arms 462a, 462b of the static portion 452. The pins 484 may secure the actuator 471 to the supports 488 while still permitting the pins 484 to slide along the slots 485.

The pin 476 may have a stop 490 formed thereon. The stop 490 may be embodied as a shoulder 491, snap ring 491, or other suitable structure 491. The stop 490 may serve to prevent the pin 476 from inserting completely into the aperture 479. In normal operation the piston 472 will continue to be forced outwardly from the cylinder 474. The stop 490 will push against the sleeve 460a causing the cylinder 474 and the pin 478 to slide along the guide 522 toward the sleeve 460b until the pin 478 inserts sufficiently into the aperture 479 of the sleeve 460b.

In certain embodiments a pad 496 may absorb the impacts of the stop 490 against the sleeve 460a. In certain embodiments a flange 494, or shoulder 494, may be formed on the pin 478. The flange 494 may be forced against a pad 496 as the cylinder is pushed along the guide 482. The pad 496 may serve to absorb impacts between the flange 494 and the sleeve 460b.

A return mechanism 498 may return the lock 464 to the state illustrated in FIG. 25A. In certain embodiments the return mechanism 498 maybe embodied as a spring 500 having one end. 502a secured to the flange 486 and the other end 402b secured to the sleeve 460a. Alternatively, the spring 500 maybe a compression spring 500 having one end 502a secured to the flange 486 and the other end 502b secured to the sleeve 460b. Likewise, a biasing spring 504 may tend to draw the piston 472 into the cylinder 474. In actual operation, the biasing spring 504 may return the piston 472 to the position of FIG. 25A when pressure ceases to be exerted on the piston 472.

Figure 26:
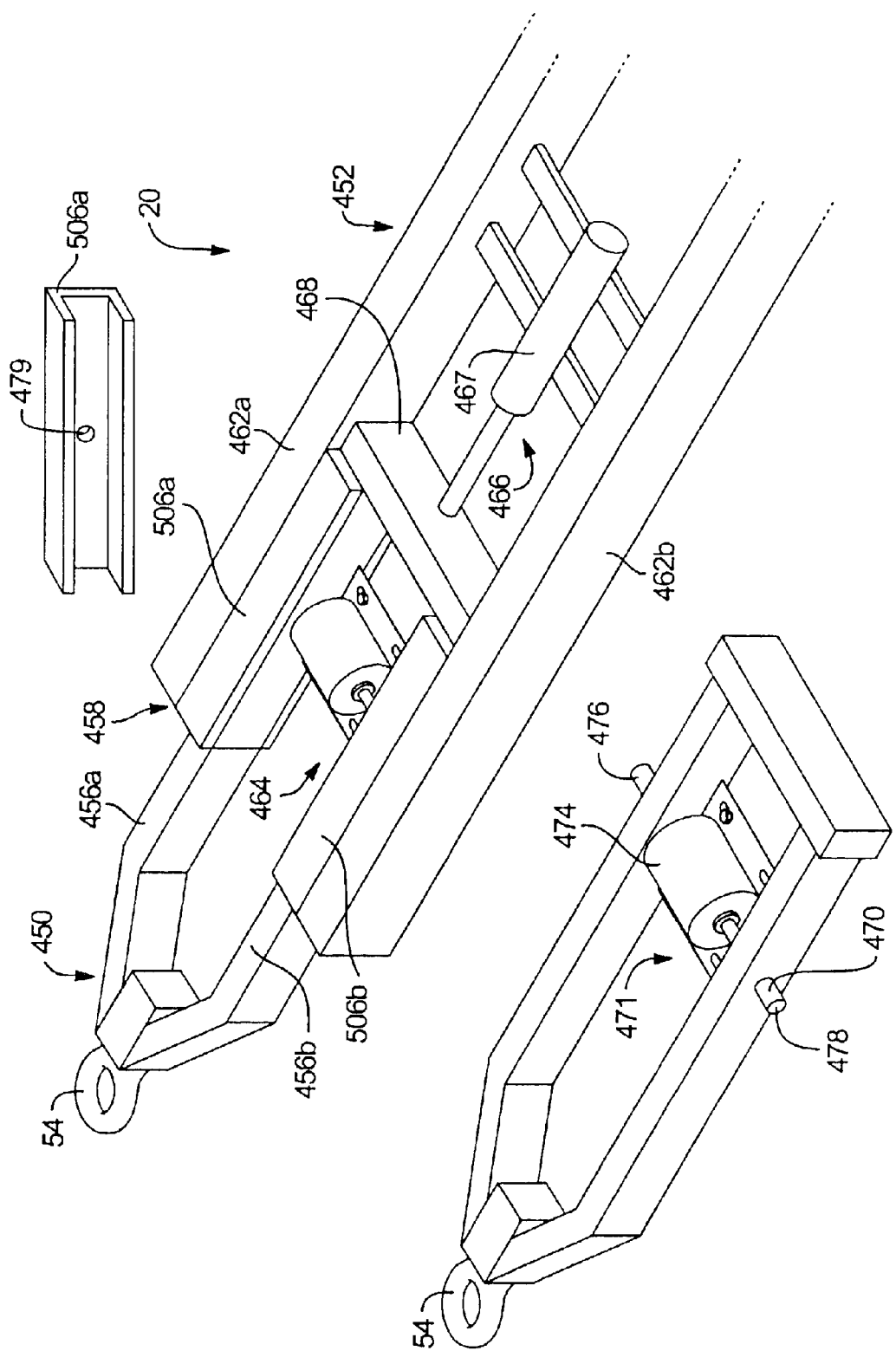
FIG. 26 is a partial perspective view of an alternative embodiment of an extensible draw bar in accordance with the invention.

Referring to FIG. 26, an extension 450 and lock 464 may be disposed in a wide range of configurations. In certain embodiments, the lock 464 may be secured to the extension 450 rather than to the static portion 452. The guide 522 may be embodied as channels 506a, 506b secured to the arms 462a, 462b of the static portion 452. In embodiments having the lock 464 secured to the extension 450, the pins 476, 478 may extend through the apertures 470 in the arms 462a, 462b whether or not the cylinder 474 is pressurized.

Figure 27:
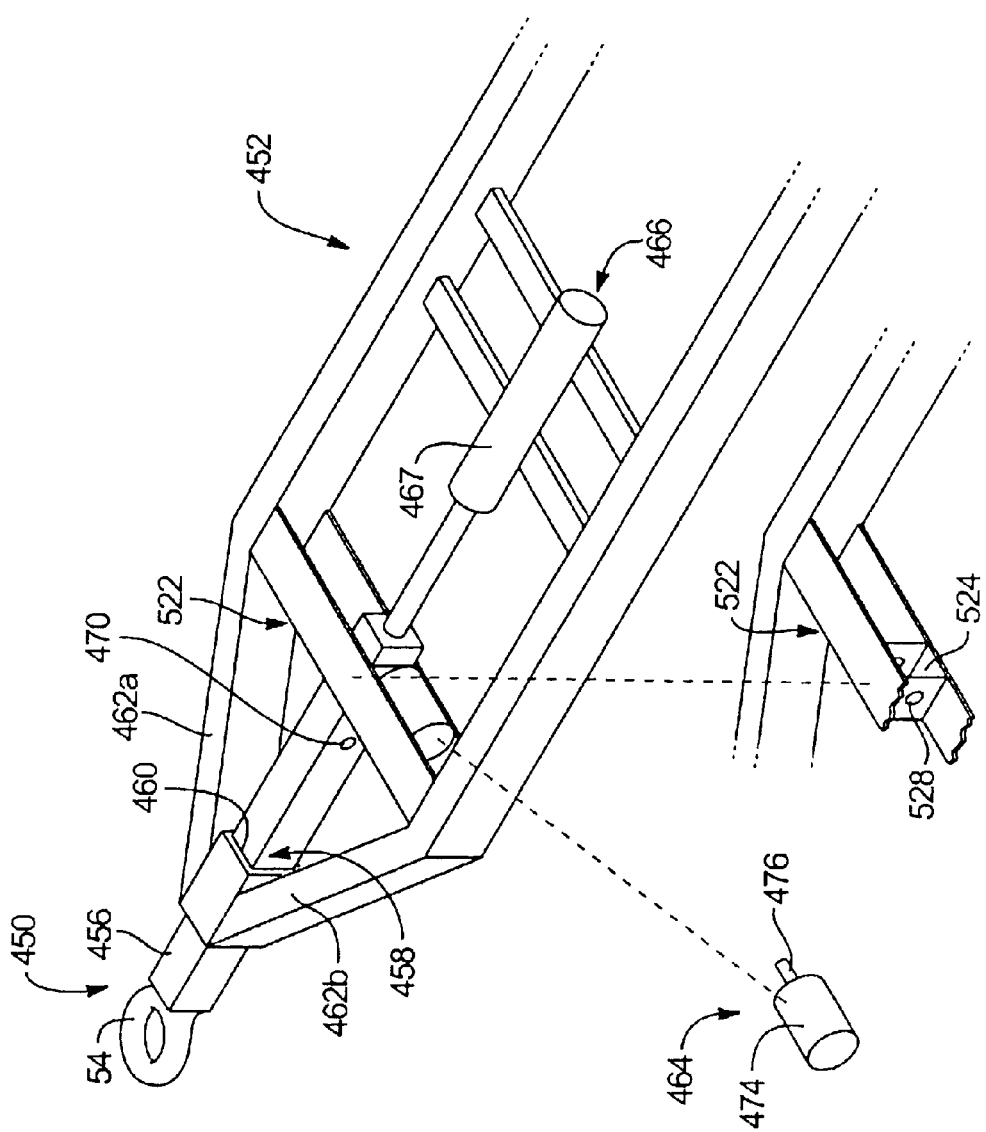
FIG. 27 is a partial perspective view of an alternative embodiment of an extensible draw bar in accordance with the invention.

Referring to FIG. 27, in certain embodiments, the extension 450 may have a single arm 456. The extension 450 may slide within a single sleeve 460 formed in the static portion 452. In certain embodiments a support 522 may also have a sleeve 524 to further guide the motion of the arm 456 and resist twisting and bending.

The lock 464 may still be have a cylinder 474 and maybe fixedly secured to the support 522. The lock 464 may drive a pin 476 into an aperture 470 formed in the arm 456. In certain embodiments the sleeve 524 may have apertures 528 formed therein. The pin 476 may accordingly extend through the aperture 528 and into the aperture 470 in order to lock the extension 450 relative to the static portion 452.

Figure 28A:
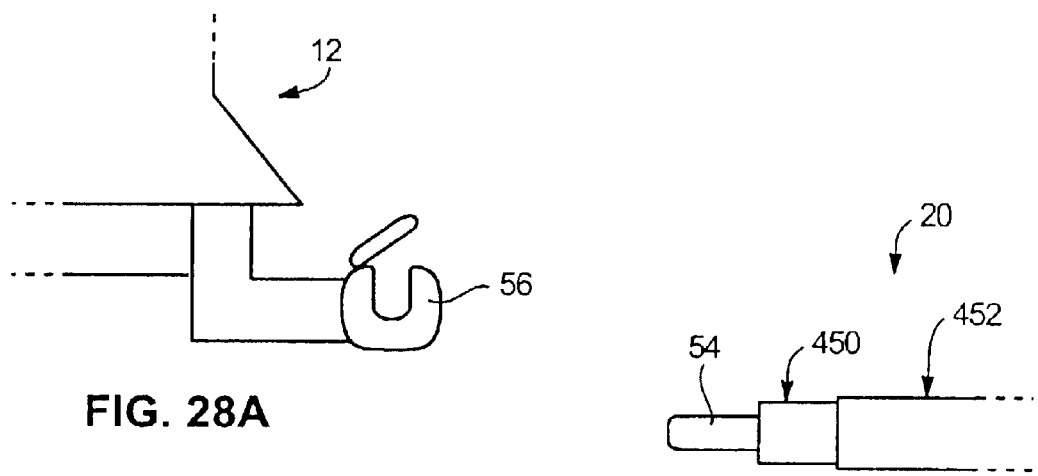
FIGS. 28A–28C are side elevation views showing a manner of operation of an extensible draw bar in accordance with the invention.
Figure 28B:
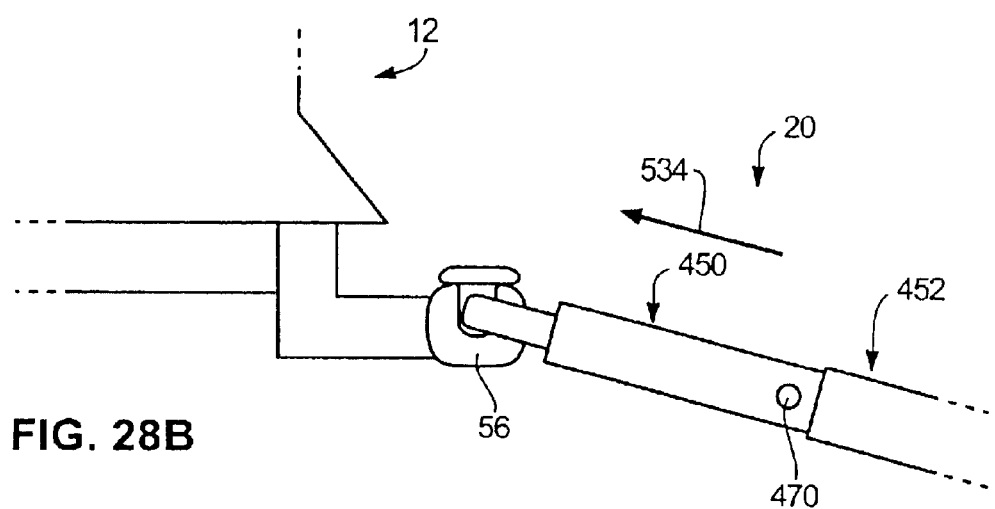
Figure 28C:
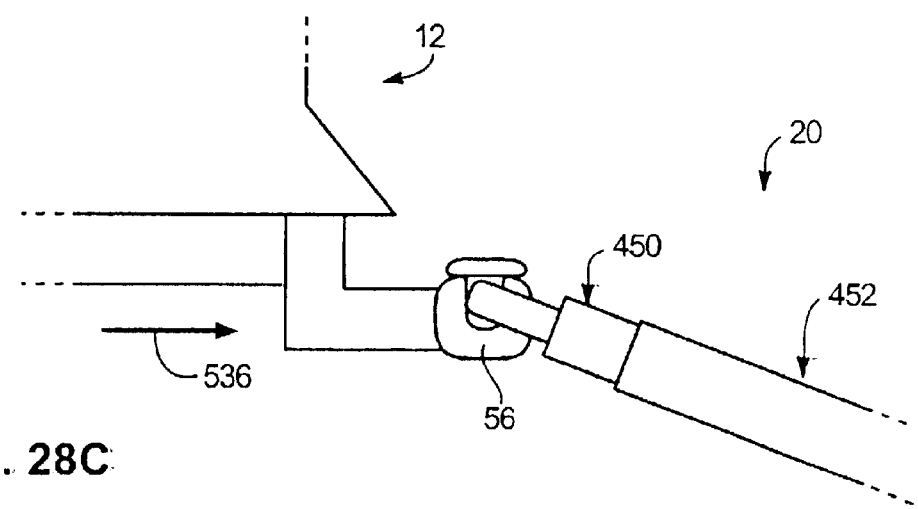

An extension 450 and static portion 452 may be used as shown in FIGS. 28A–28C. A truck 12 may park near the pintle ring 54 as shown in FIG. 28A. An operator may disengage the lock 464, permitting the extension 450 to be drawn out in a direction 534 and the pintle ring 54 placed over the hitch 56. In certain embodiments the extender 466 maybe activated to provide a force tending to extend the extension 450 from the static portion 452.

The operator may then activate the lock 464 by, for example, pressurizing the cylinder 474. With the cylinder 474 pressurized and the extension in the position shown in FIG. 28B, the pins 476, 478, or pin 476, will press against the arms 456a, 456b, or arm 456. The operator may then back the truck 12 toward the trailer 18 in a direction 536.

As the extension 450 is pushed toward the static portion 452, the lock 464 eventually engages by, for example, forcing the pins 476, 478, into the apertures 470 in the arms 456a, 456b as the apertures 470 become aligned with the pins 478, 476. The lock 464 may, alternatively, force a single pin 476 into a single aperture 470 in an arm 456 as the pin 476 becomes aligned with the aperture 470. The truck 12 and trailer 18 are then positioned suitable for towing as shown in FIG. 28C.

The present invention maybe embodied in other specific forms without departing from its essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus for transferring modules onto a vehicle, the apparatus comprising:
    a vehicle having a frame extending longitudinally between a distal end and a proximal end and a floor secured to the frame between the proximal end and the distal end thereof to extend laterally and continuously from a right side to a left side thereof;
    a module comprising a body having a proximal end and a distal end for mounting to the frame;
    a drive mounted to the frame for urging the module to translate with respect to the frame;
    the module, further comprising a track having a first end and a second end, the track secured to the body exclusively by the second end of the track connected proximate the distal end of the body to engage the driver to selectively translate the module between a first, loaded position proximate the proximal end of the frame, wherein the body is resting on the frame, and the track is positioned nominally vertically opposite the body with respect to the floor, and a second, unloaded position proximate the distal end of the frame; and
    a lock secured to the frame to selectively secure and release the module with respect to the frame.

2. The apparatus of claim 1, wherein the track is pivotably secured to the body proximate the distal end in the loaded position.

3. The apparatus of claim 1, wherein the body rests on the floor and the track is positioned nominally vertically under the floor without penetrating the floor, in the loaded position.

4. The apparatus of claim 1, wherein the track is pivotably secured to the body.

5. The apparatus of claim 4, wherein, in the loaded position, the track comprises a bar having a first end proximate the proximal end to engage the driver in translating the module, and a second end pivotably secured to of the body proximate the distal end.

6. The apparatus of claim 5, wherein the tack further comprises a conveyor secured to the bar and extending between the first end and the second end to urge the track to translate.

7. The apparatus of claim 6, wherein the conveyor is selected from a chain, belt, rail, rack, and surface.

8. The apparatus of claim 7, wherein the driver comprises a hydraulic motor having a drive wheel coupled thereto, the drive wheel selectiveley engaging the conveyor.

9. The apparatus of claim 8, wherein the bar is provided with an aperture formed proximate the second end of the bar, and wherein the lock comprises a rod slidably secured to the frame and selectively insertable through the aperture when the body is in the loaded position.

10. The apparatus of claim 1, wherein the body further comprises a proximal wall secured to the floor and extending at least nominally vertically upward, and lateral walls extending at least transversely upward from the floor and secured to the proximal wall, the lateral walls being spaced from one another in the lateral direction and extending substantially continuously in the longitudinal direction between the proximal end and the distal end.

11. The apparatus of claim 10, wherein the body and track are positioned nominally vertically opposite one another with respect to the floor, and the track positioned transversely below the floor to extend longitudinally along the floor when the body is in the loaded position.

12. The apparatus of claim 11, wherein the track is pivotably secured to the body.

13. The apparatus of claim 10, wherein the track comprises a bar having a first end proximate the proximal end to initially engage the driver, and a second end pivotably secured to the distal end of the body.

14. The apparatus of claim 11, further comprising a conveyor secured to the bar and extending between the first end and the second end.

15. The apparatus of claim 14, wherein the conveyor is selected from a chain, belt, rail, rack and surface.

16. The apparatus of claim 15, wherein the driver comprises a hydraulic motor having a drive wheel coupled thereto, the drive wheel selectively engaging the conveyor.

17. The apparatus of claim 16, wherein the bar comprises an aperture formed proximate the distal end, and wherein the lock comprises a rod slidably secured to the frame to be selectively insertable through the aperture when the body is in the stowed position.

* * * * *